Sept. 4, 1962 G. HIRS 3,052,070

PARTS TRANSPORTING AND STORAGE APPARATUS

Filed Dec. 7, 1959 15 Sheets-Sheet 1

INVENTOR.

GENE HIRS.

BY

Wallace P. Lamb

ATTORNEY.

Sept. 4, 1962 G. HIRS 3,052,070

PARTS TRANSPORTING AND STORAGE APPARATUS

Filed Dec. 7, 1959 15 Sheets-Sheet 2

INVENTOR.
GENE HIRS.
BY
Wallace P. Lamb
ATTORNEY.

Sept. 4, 1962 G. HIRS 3,052,070

PARTS TRANSPORTING AND STORAGE APPARATUS

Filed Dec. 7, 1959 15 Sheets-Sheet 3

INVENTOR.
GENE HIRS.
BY
Wallace P. Lamb
ATTORNEY.

PARTS TRANSPORTING AND STORAGE APPARATUS

Filed Dec. 7, 1959 15 Sheets-Sheet 4

INVENTOR.
GENE HIRS.
BY
Wallace P. Lamb
ATTORNEY.

INVENTOR.
GENE HIRS.
BY
Wallace P. Lamb
ATTORNEY.

Sept. 4, 1962 G. HIRS 3,052,070

PARTS TRANSPORTING AND STORAGE APPARATUS

Filed Dec. 7, 1959 15 Sheets-Sheet 6

INVENTOR.
GENE HIRS.

BY

Wallace P. Lamb
ATTORNEY.

Sept. 4, 1962 G. HIRS 3,052,070

PARTS TRANSPORTING AND STORAGE APPARATUS

Filed Dec. 7, 1959 15 Sheets-Sheet 7

INVENTOR.
GENE HIRS
BY
Wallace P. Lamb
ATTORNEY.

INVENTOR.
GENE HIRS.
BY
Wallace P. Lamb
ATTORNEY.

PARTS TRANSPORTING AND STORAGE APPARATUS

INVENTOR.
GENE HIRS.
BY
Wallace P. Lamb
ATTORNEY.

INVENTOR.
GENE HIRS.

BY Wallace P. Lamb
ATTORNEY.

Sept. 4, 1962 G. HIRS 3,052,070

PARTS TRANSPORTING AND STORAGE APPARATUS

Filed Dec. 7, 1959 15 Sheets-Sheet 11

INVENTOR.
GENE HIRS.

BY

Wallace P. Lamb
ATTORNEY.

PARTS TRANSPORTING AND STORAGE APPARATUS

Filed Dec. 7, 1959 15 Sheets-Sheet 12

INVENTOR.
GENE HIRS.

BY

Wallace P. Lamb
ATTORNEY.

INVENTOR.
GENE HIRS.
BY
Wallace P. Lamb
ATTORNEY.

INVENTOR.
GENE HIRS.
BY
Wallace P. Land
ATTORNEY.

PARTS TRANSPORTING AND STORAGE APPARATUS

Filed Dec. 7, 1959 15 Sheets-Sheet 15

INVENTOR.
GENE HIRS.
BY
Wallace P. Lamb
ATTORNEY.

United States Patent Office 3,052,070

Patented Sept. 4, 1962

3,052,070
PARTS TRANSPORTING AND STORAGE APPARATUS

Gene Hirs, 17208 Greenview, Detroit, Mich.
Filed Dec. 7, 1959, Ser. No. 857,765
8 Claims. (Cl. 53—55)

This invention relates generally to parts transporting and storage apparatus and particularly to transporting and storage apparatus for round or cylindrical parts.

One of the objects of the present invention is to provide an improved apparatus for automatically loading, storing and unloading round parts with respect to a parts storage unit.

Another object of my invention is to provide a new and improved parts transporting and storage unit in which fixtures containing round parts are moved up a helical storage ramp from a loading station to an unloading station and returned empty down a helical return ramp to the loading station.

Another object of the invention is to provide a parts storage unit of the above mentioned character in which operation of the parts loading mechanism to load the fixture is initiated by the presence of a fixture at the loading station.

Another object of the invention is to provide an improved automatically operable parts transporting and storage apparatus.

Another object of the invention is to provide an improved parts loading machine for feeding round parts into a fixture of a parts storage unit.

Another object of the invention is to provide an improved parts unloading machine for unloading parts from a fixture of a parts storage unit.

A further object of the invention resides in my novel control systems for automatically controlling the operations of the apparatus.

Other objects of the invention will become apparent from the following description, taken in connection with the drawings in which.

Figure 8:
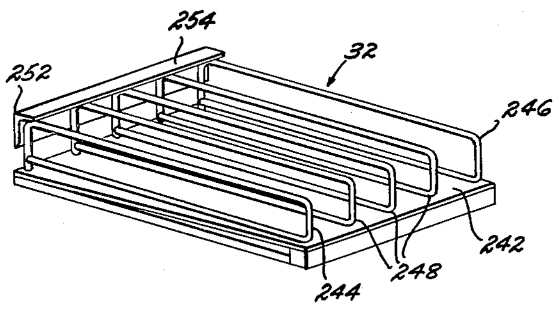
Figure 7:
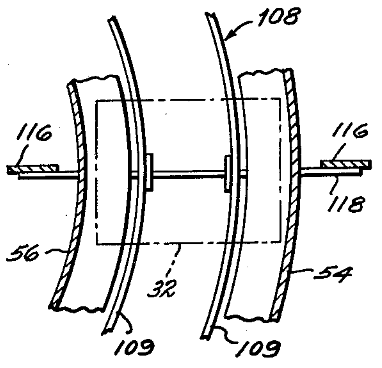
Figure 6:
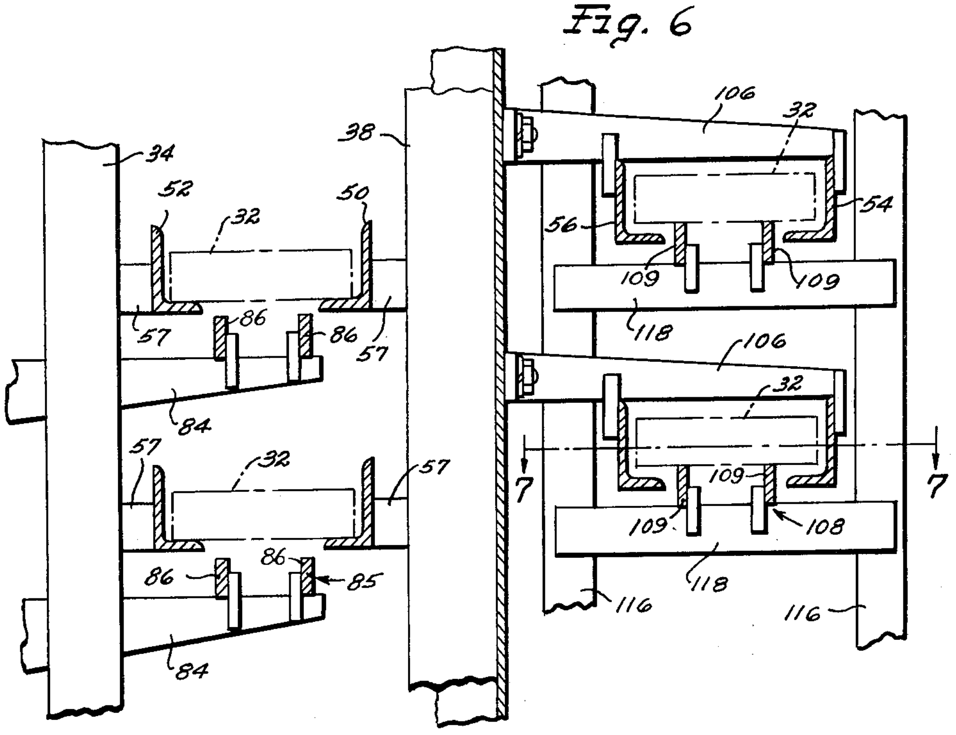
FIG. 6 is a vertical sectional view, taken along line 6—6 of FIG. 3.
Figures 13, 14:
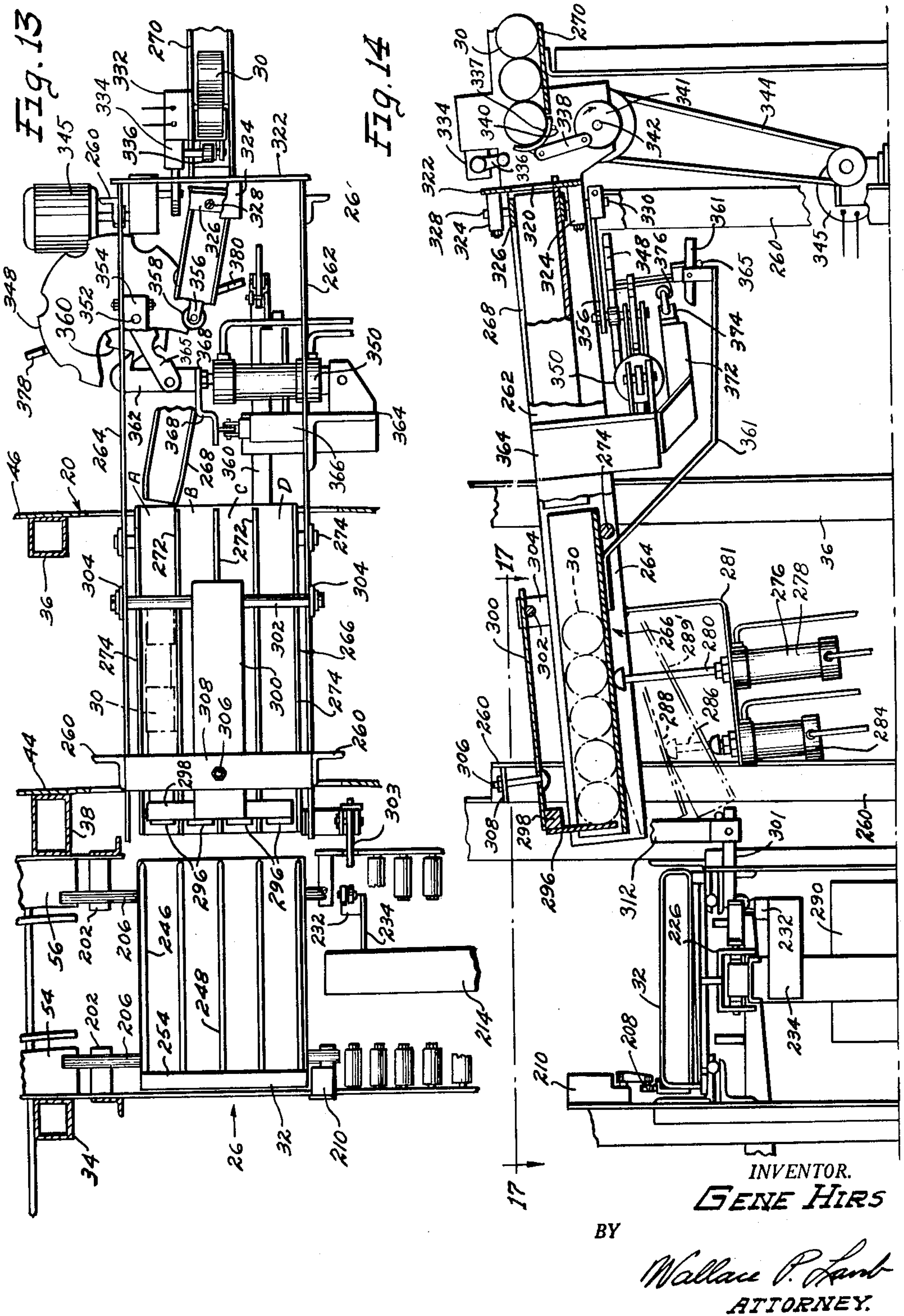
Figure 15:
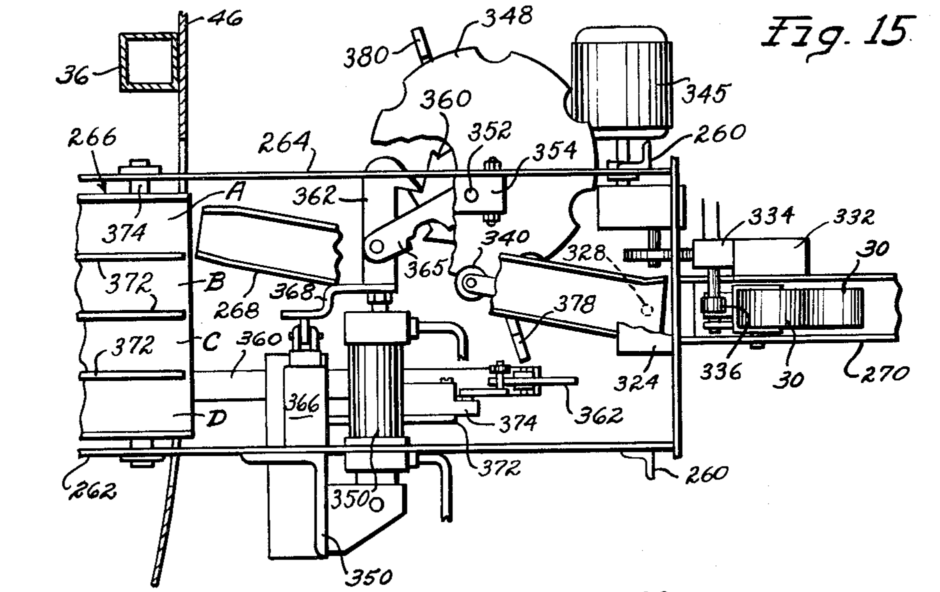
Figure 16:
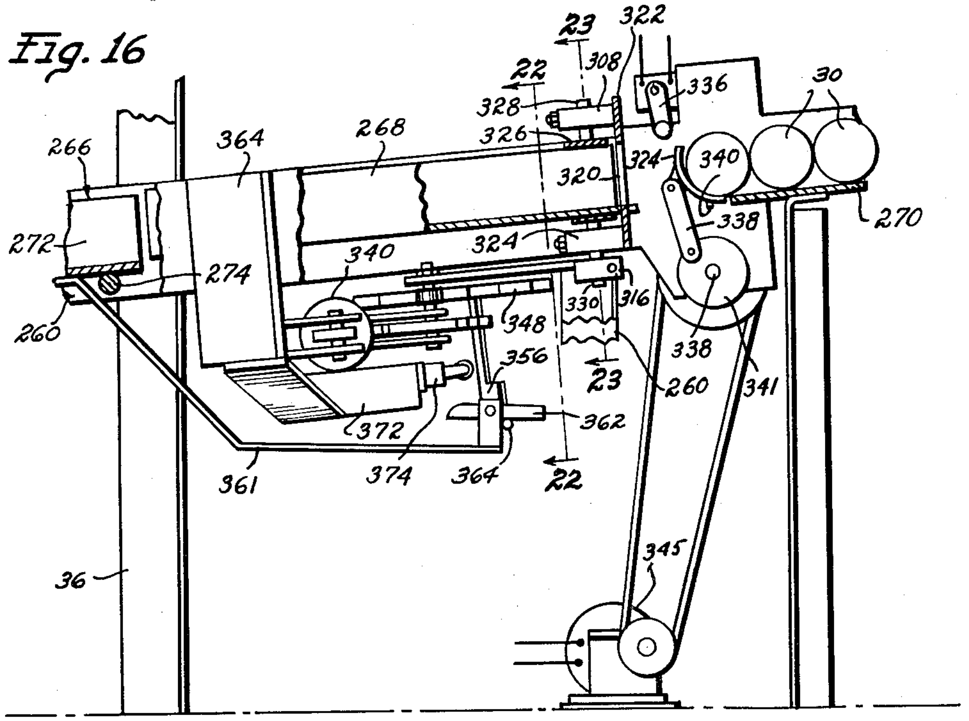
Figures 17, 18:
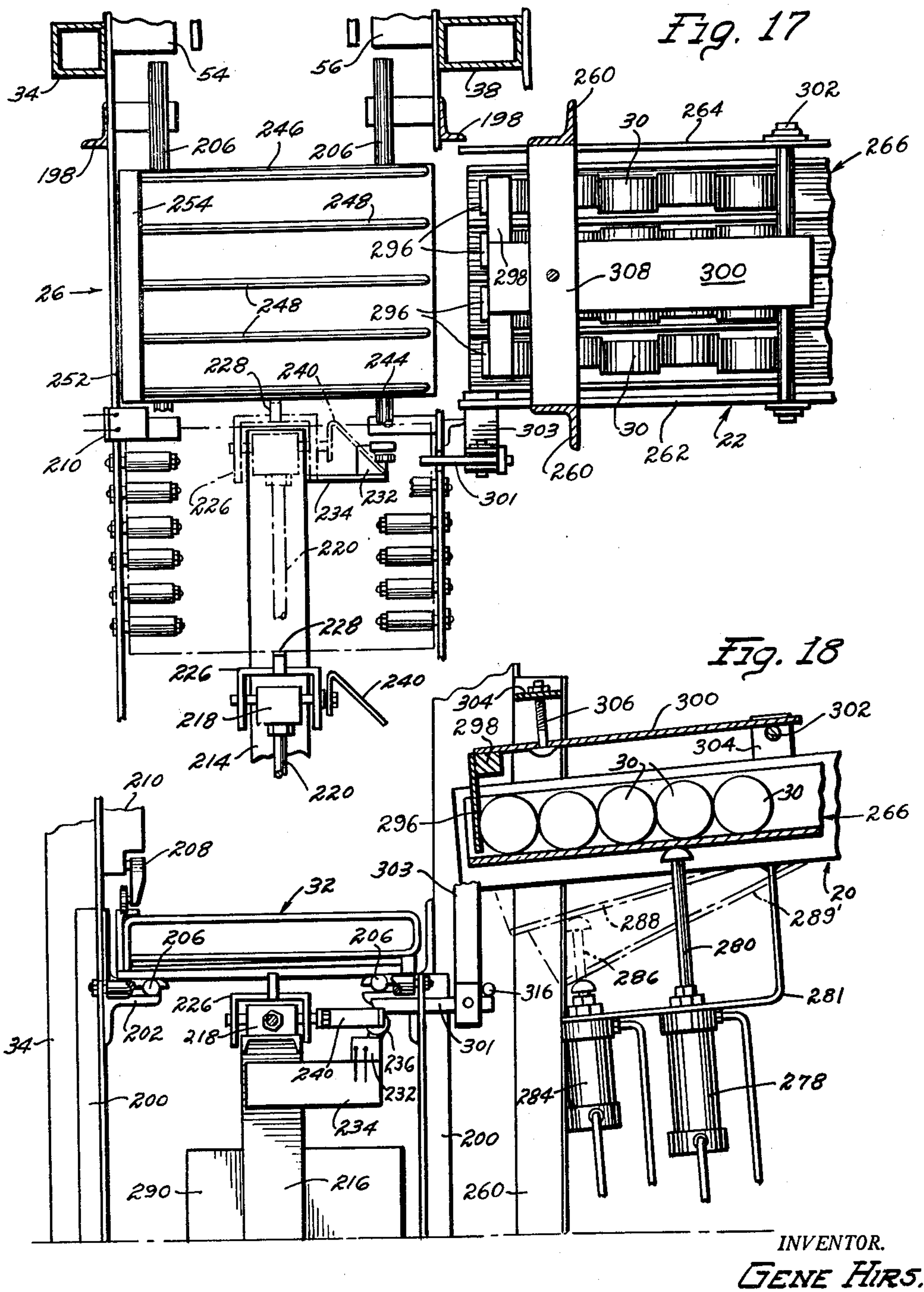
Figures 19, 20, 21:
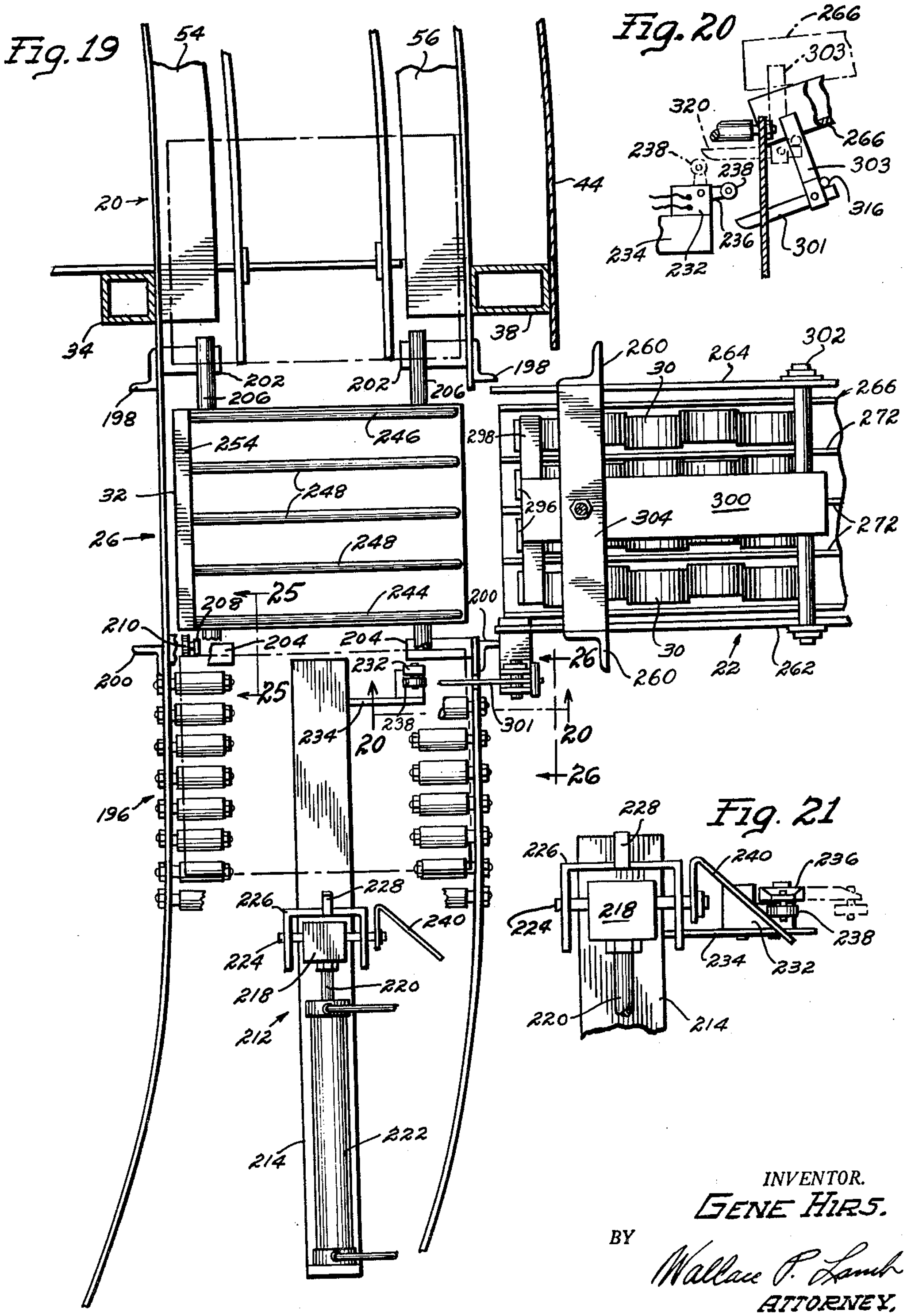
Figure 22:
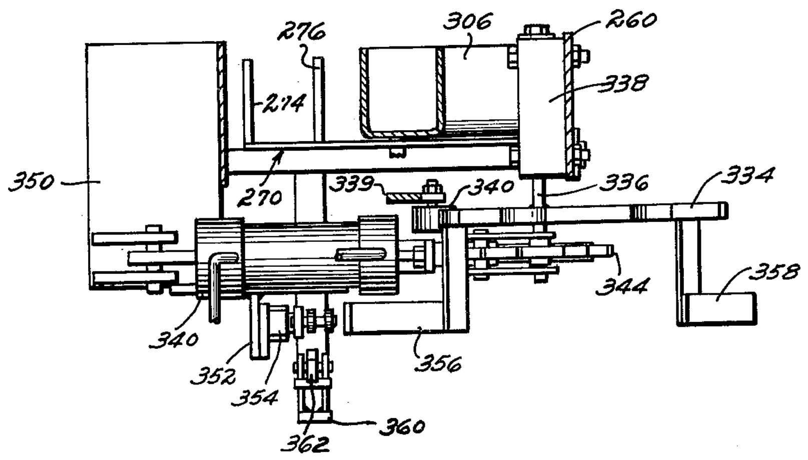
Figures 23, 24:
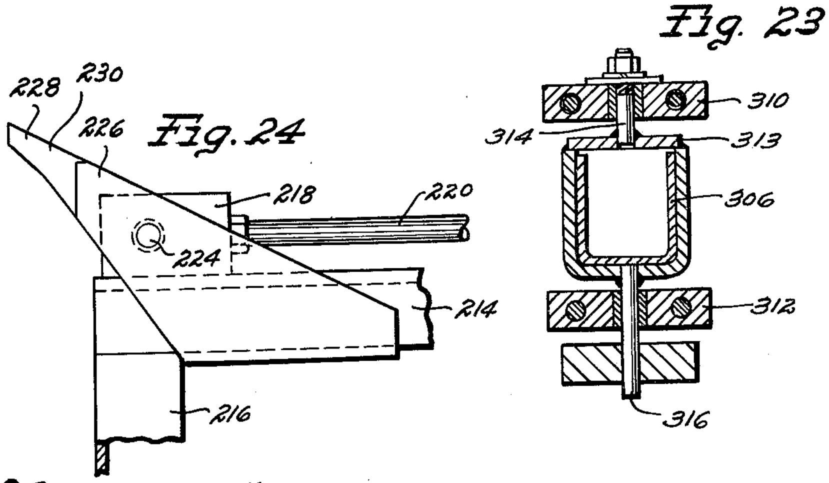
Figure 26:
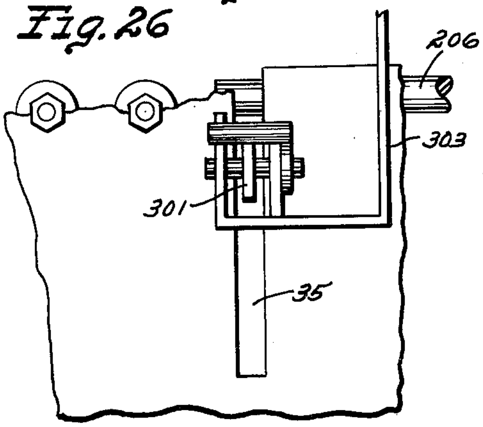
Figure 25:
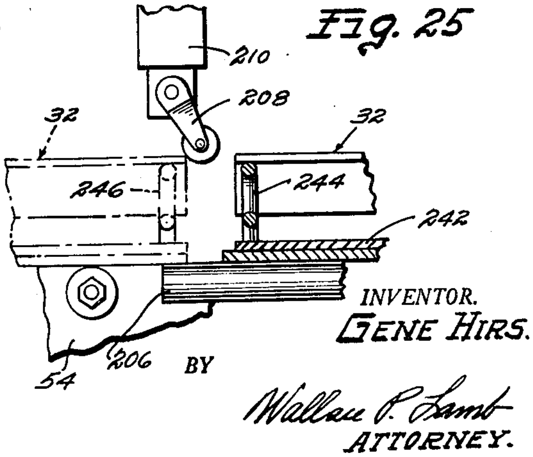
Figure 27:
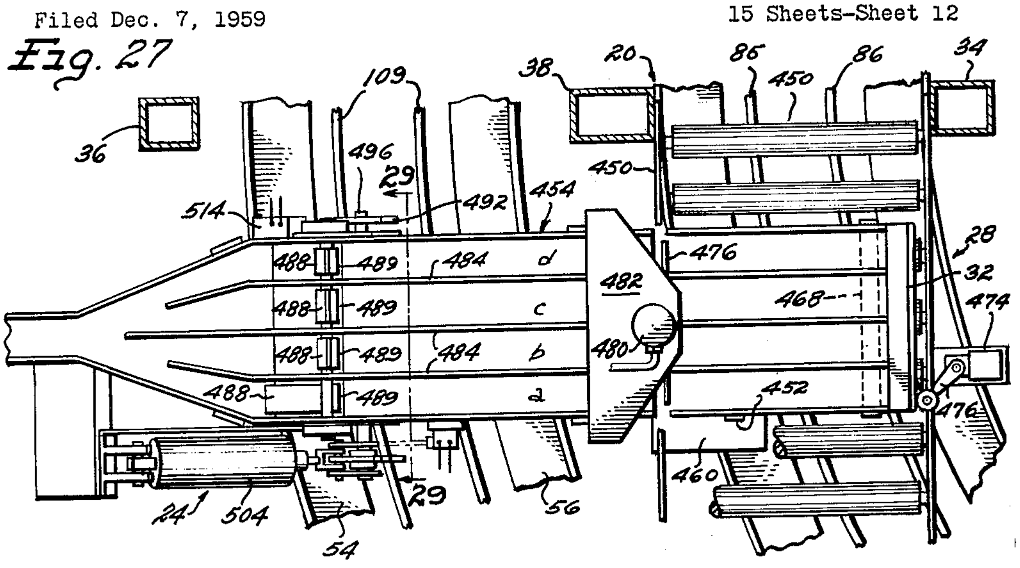
Figure 28:
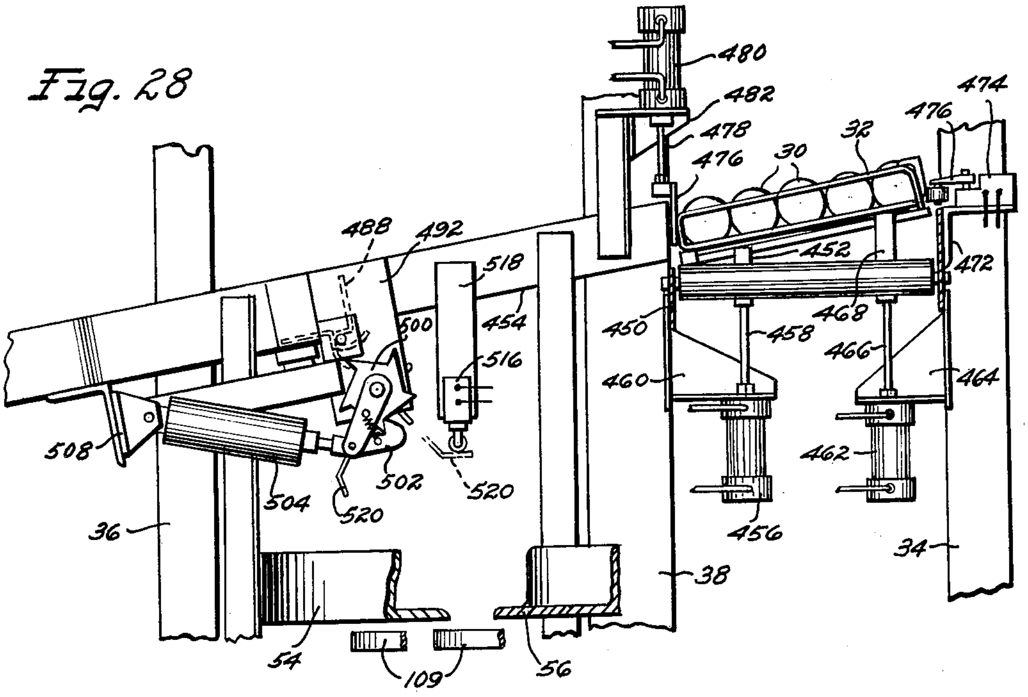
Figures 29, 30:
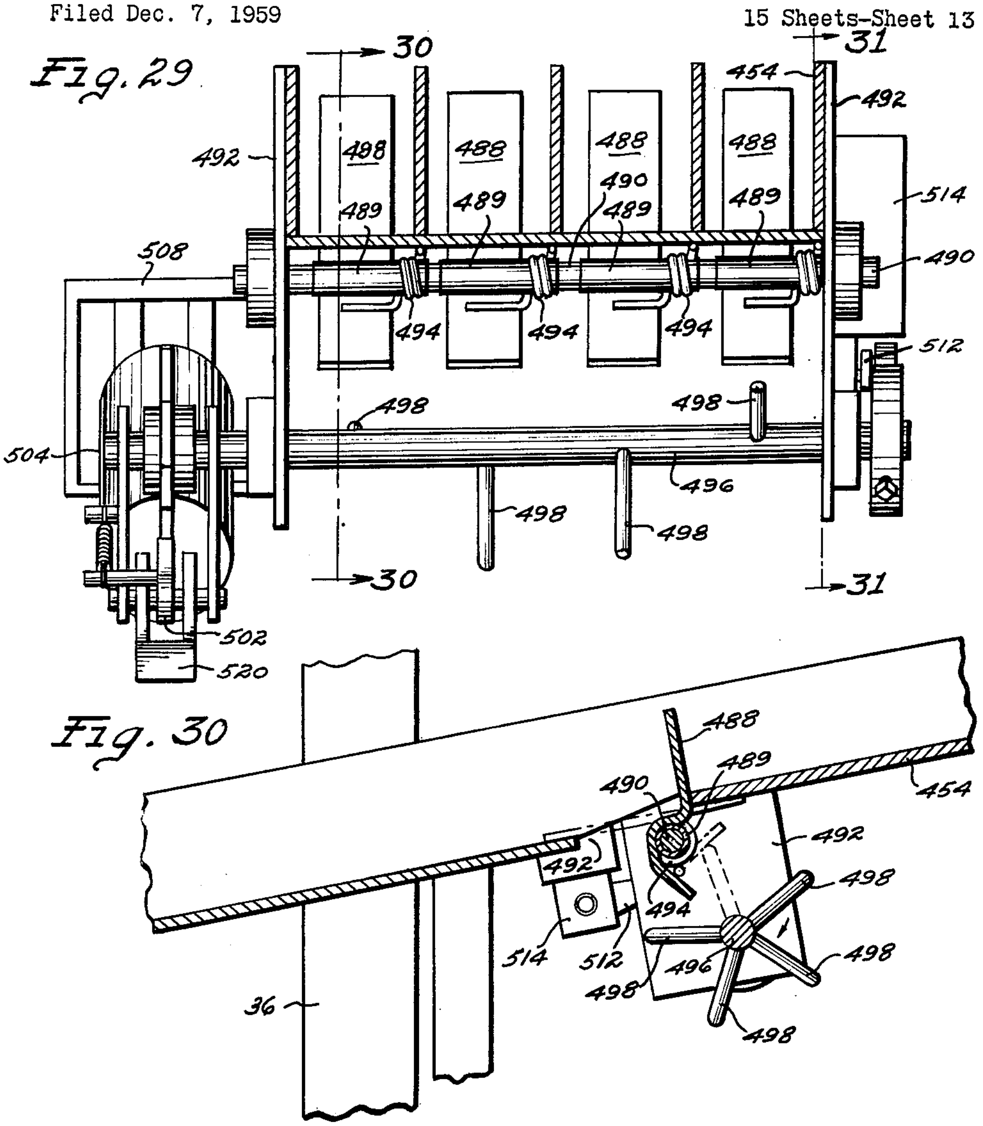
Figure 31:
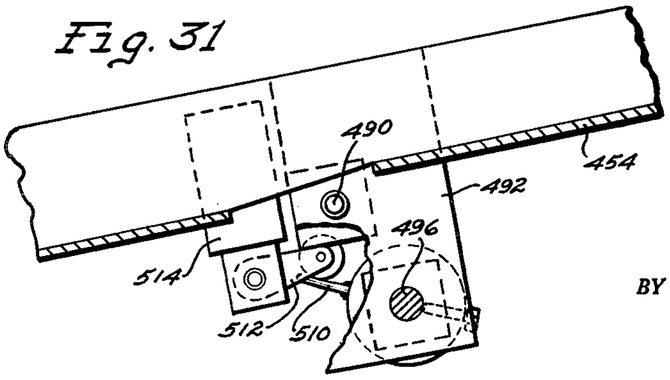
Figure 32:
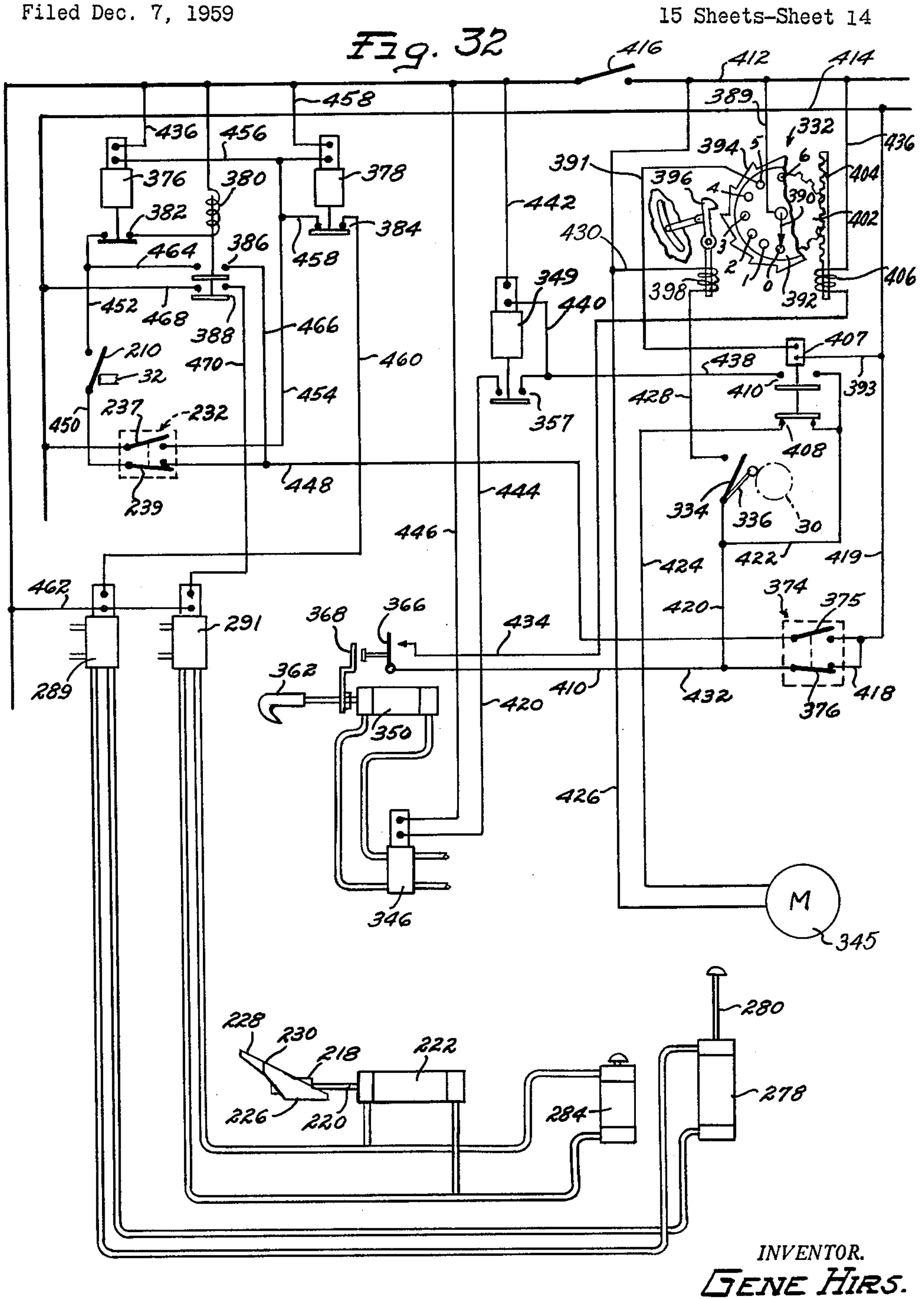
Figure 33:
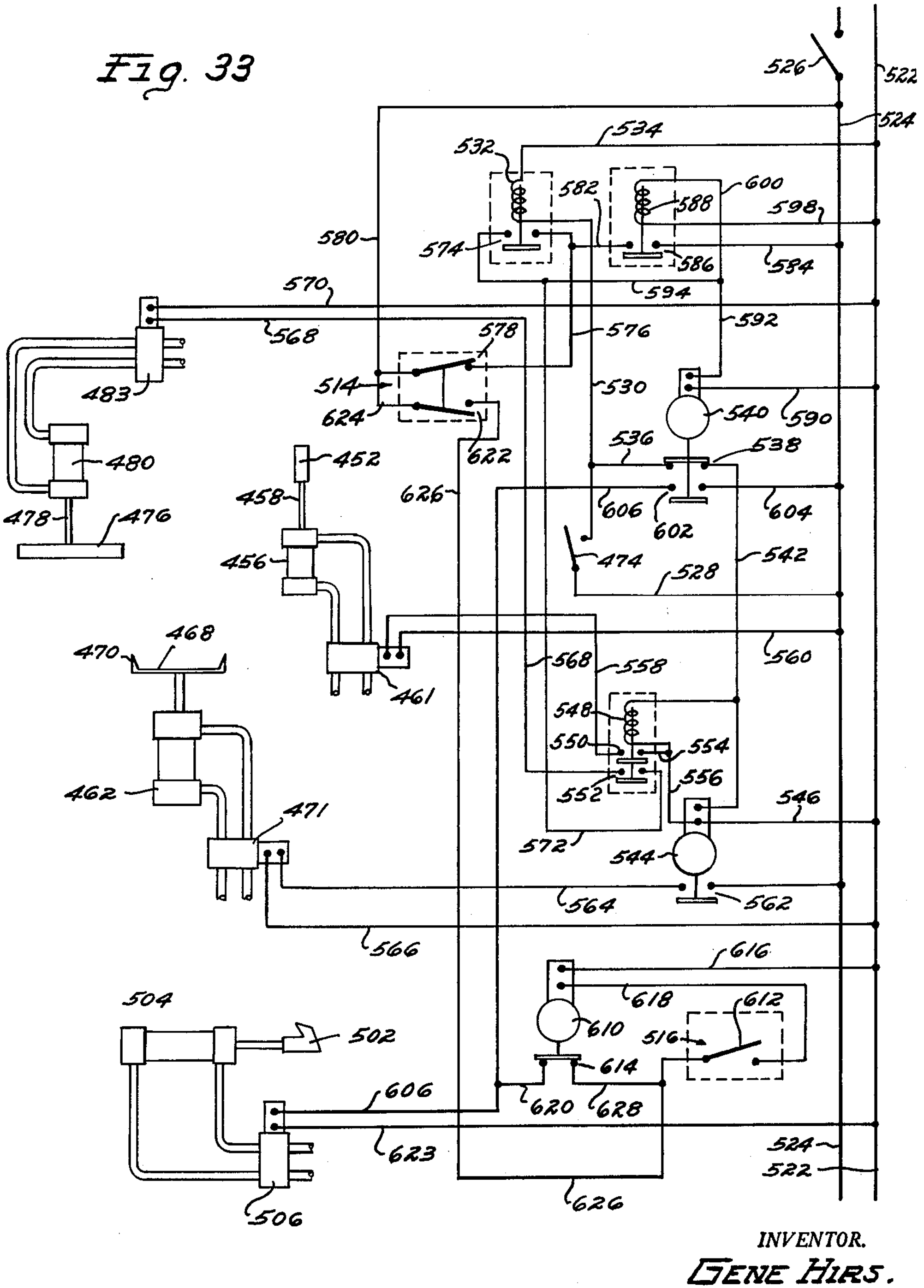

FIG. 7 s a horizontal sectional view, taken along line 7—7 of FIG. 6;

FIG. 8 is a perspective view of one of the parts carrying fixtures of the apparatus;

FIGS. 9, 10, 11 and 12 are similar diagrammatic views illustrating different stages of operation of mechanism of the parts storage unit;

FIG. 13 is a plan view of my parts loading unit and fragment of the parts storage unit;

FIG. 14 is a side view with parts broken away and in section;

FIG. 15 is an enlarged fragmentary plan view of the parts loading unit of FIG. 13;

FIG. 16 is a fragmentary side view with parts broken away and in section;

FIG. 17 is an enlarged fragmentary plan view of the parts storage unit and the parts loading unit, taken along the line 17—17 of FIG. 14;

FIG. 18 is a fragmentary elevational view partly in section of FIG. 17;

FIG. 19 is another plan view similar to FIG. 17;

FIG. 20 is a fragmentary detail view, taken along line 20—20 of FIG. 19;

FIG. 21 is a fragmentary detail plan view;

FIG. 22 is a vertical cross sectional view taken along line 22—22 of FIG. 16;

FIG. 23 is a vertical sectional view, taken along line 23—23 of FIG. 16;

FIG. 24 is an enlarged fragmentary detail view;

FIG. 25 is a fragmentary view partly in section, taken along the line 25—25 of FIG. 19;

FIG. 26 is a fragmentary side view taken in the direction of the arrows 26—26 of FIG. 19;

FIG. 27 is an enlarged plan view partly in section showing principally a parts unloading machine;

FIG. 28 is a fragmentary side view of the machine of FIG. 27;

FIG. 29 is a cross sectional view, taken along the line 29—29 of FIG. 27;

FIG. 30 is a vertical sectional view, taken along the line 30—30 of FIG. 29;

FIG. 31 is a fragmentary elevational view, taken in the direction of the arrows 31—31 of FIG. 29;

FIG. 32 is a diagrammatical illustration of the controls and circuitry of the parts loading machine; and FIG. 33 is a diagrammatical illustration of the controls and circuitry of the parts unloading machine.

Referring to the drawings by characters of reference, my parts handling apparatus comprises, in general, a parts storage unit 20, a parts loading machine 22 and a parts unloading machine 24. The parts storage unit 20 has a lower parts loading station 26 at which the loading machine 22 is located and has an upper unloading station 28 at which the parts unloading machine 24 is located (see FIGS. 17 and 27). The present apparatus is particularly adapted, although not limited, to the handling and storage of round or cylindrical parts, as at 30, which are carried in basket-like containers or fixtures 32, a component of the storage unit 20.

Figure 1:
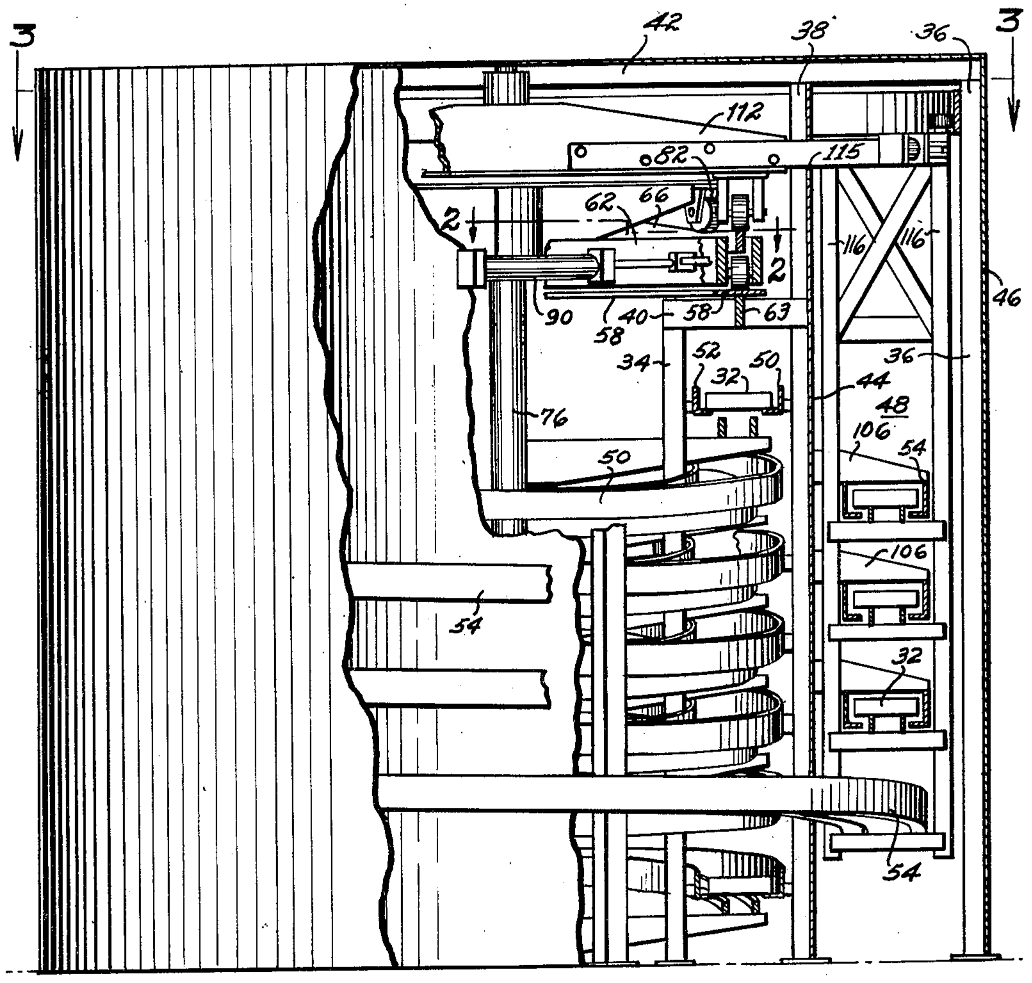
FIG. 1 is an elevational view partly broken away and in section of my parts handling and storage apparatus.

The parts storage unit 20 is a fabricated structure having load supporting members including a plurality of radially spaced inner posts 34, a plurality of radially spaced outer posts 36, and a plurality of intermediate radially spaced posts 38. As shown in FIG. 1, the upper ends of the inner posts 34 terminate below the upper ends of the other posts and are respectively connected to corresponding ones of intermediate posts 38 by radially disposed horizontal connecting members 40. Across the top of the parts storage structure is a number of cross members 42 that are welded to the upper ends of the posts 36 and 38 for structural rigidity (see FIG. 1). Further, the intermediate posts 38 are rigidly connected together preferably by a cylindrical sheet metal casing 44 and the outer posts 36 by a similar sheet metal casing 46. As shown, the casings 44 and 46 are respectively secured to the outer faces of the posts 38 and 36 and provide therebetween an annular storage space 48.

Mounted on and between posts 34 and 38 is an inner pair of parallel helical storage rails 50 and 52 having a common vertical helix axis, the helical rails 50, 52 extending upwardly from the parts loading station 26 to the upper parts unloading station 28. A second and outer pair of spaced parallel helical rails 54 and 56 are mounted on and between posts 36 and 38 having a common helix axis coincident with the common helix axis of rails 50, 52. The rails 54, 56 extend downwardly from the unloading station 28 to the loading station 26 at a reverse helix angle to that of the inner storage rails 50 and 52. The fixtures 32, loaded with the round parts 30 travel from the loading station 26 up to the rails 50, 52 and after unloading of the parts 30 at the unloading station 28 return empty by way of rails 52, 54 to the loading station 26.

The parts storage rails 50, 52 are disposed between and mounted respectively on the inner posts 34 and the intermediate posts 38. These rails are preferably made of angle stock having inwardly directed legs for supporting the fixtures 32. The upright legs of the rails 50, 52 are preferably spaced from the adjacent posts by spacers 57 (see FIG. 6) and the rails, spacers and posts may be welded or be otherwise rigidly secured together to provide a rigid structure.

Mounted on the posts 34 and 38 above and adjacent the connecting members 40 is a horizontally disposed annular support or plate 58 for a rotatable cam carrier 60 that is rotatable about a vertical axis coincident with the helix axes of the parts storage rails. Preferably, the carrier 60 comprises a pair of spaced concentric rings carrying therebetween three radially spaced rollers 62 to support the cam carrier 60 on the support 58. As shown in FIG. 1, a plurality of connecting members 63 respectively connect adjacent structural members 40 together and the supporting member 58 seats on and is rigidly secured to the upper edges of members 63. Preferably the members 58, 63 and 40 are welded together.

Figure 2:
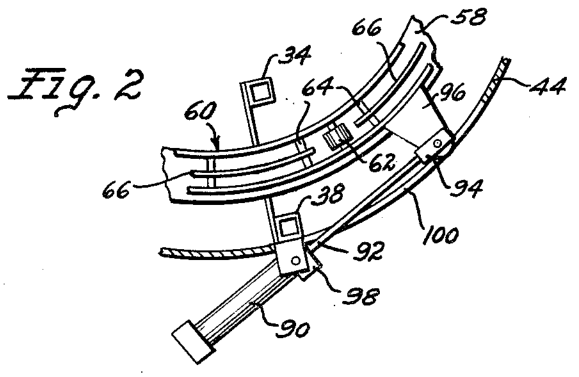
FIG. 2 is a fragmentary cross sectional view, taken substantially along the line 2—2 of FIG. 1.
Figure 3:
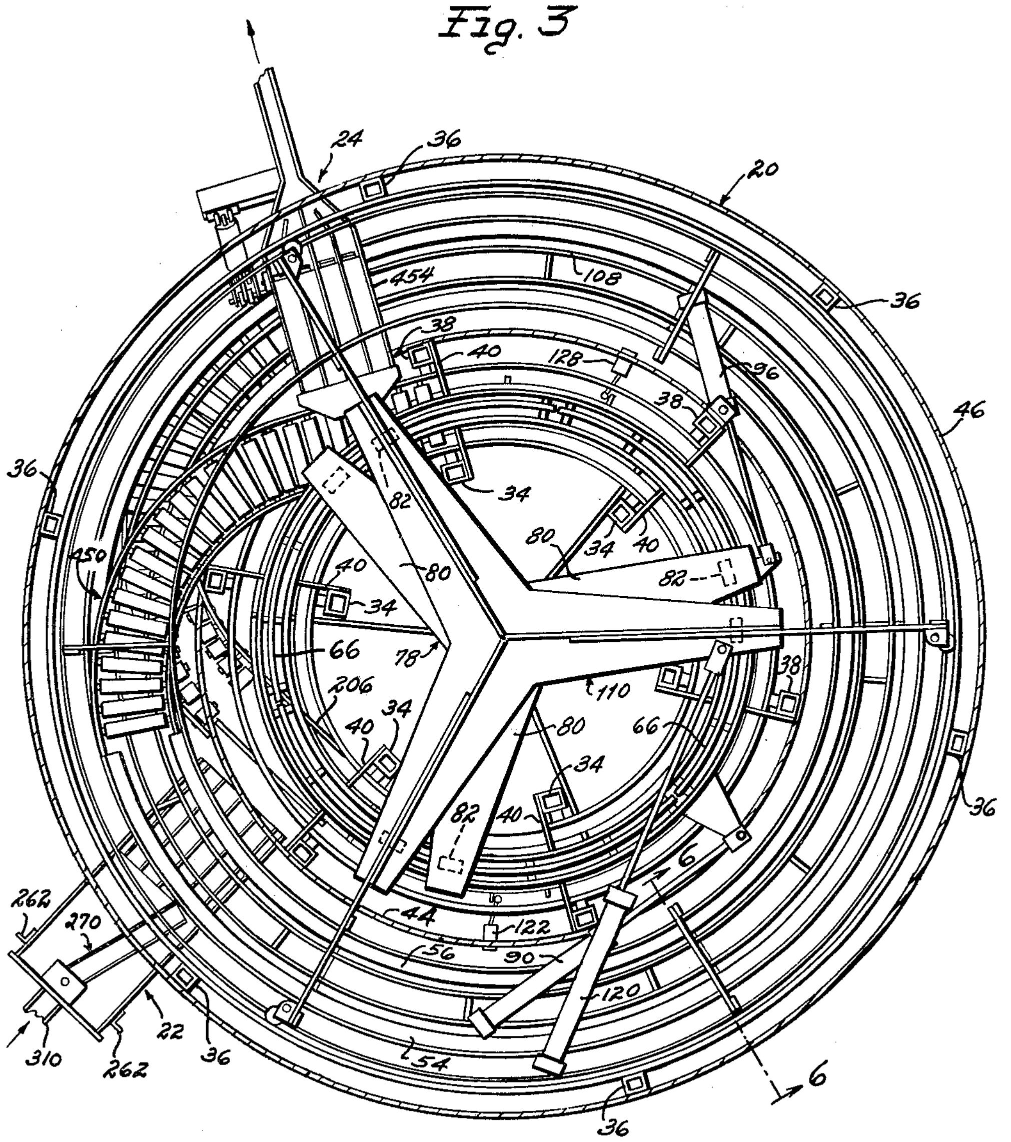
FIG. 3 is a cross sectional view taken substantially along the line 3—3 of FIG. 1.
Figure 4:
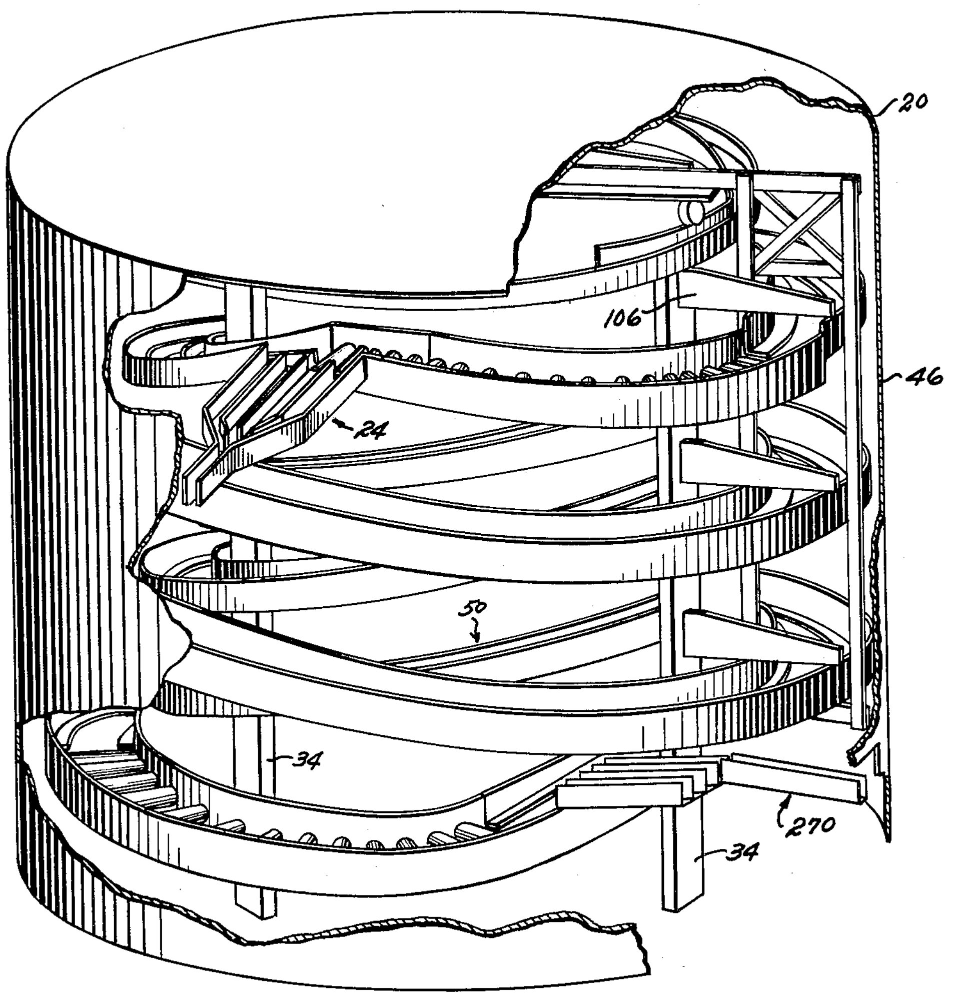
FIG. 4 is a fragmentary perspective view partly broken away and in section.

As is more clearly shown in FIG. 2, the spaced concentric rings of the cam carrier 60 are spaced apart and joined together by spacers 64 welded thereto. Carried by and between the rings of the carrier 60 is a plurality of like arcuate cam members 66 seating on and welded to the spacers 64. There are preferably three of the cam members 66 radially spaced for proper load distribution, the cam surfaces, being formed on the upper edges of each cam member 66, above the carrier 62. As shown more clearly in the illustrations of FIGS. 8 to 11, each of the cam members 66 has, intermediate the ends of its cam surface, a low or starting point 70 from which the cam surface is inclined in opposite directions, as at 72 and 74.

A vertical shaft 76 having its axis coincident with the axes of the storage rails and of cam members 66, extends upwardly through plate 58 and fixed to the upper end of shaft 76 is a spider 78. The spider 78 preferably has three radially spaced horizontal arms 80 each of which carries a cam follower or roller 82, the rollers disposed to ride respectively on the upwardly facing cam surfaces of cam member 66. Thus, it will be seen that the shaft 76 is supported by and on the spider 78 whereby the cam carrier 60 is rotatable to raise and/or lower the shaft 76 and is also rotatable with the spider 78.

Rigidly secured to the shaft 76 are radially spaced arms 84 which extend therefrom into the spaces between convolutions of the storage rails 50, 52. Welded or otherwise secured to the upper edges of the arms 84 is a helical transfer member 85 that has the same helix angle as the parts storage rails 50, 52. The transfer member 85 comprises two parallel rails 86 positioned between the rails 50, 52 and normally therebelow, as shown. The rails 86 are supported on and may be rigidly secured to the arms 84 by welding or by other suitable means. By this construction and arrangement it will be seen that when shaft 76 is raised by rotation of cam carrier 60, the transfer rails 85 are carried upwardly therewith and pick up all of the fixtures 32 that are on the storage rails 50, 52. An air cylinder 96' is connected to rotate the shaft 76 and thus the transfer member 85.

As shown in the detail view of FIG. 2, the cam carrier 60 may be reciprocally operated by an air cylinder 90 having its piston connecting rod 92 connected by a clevis 94 to a bracket 96 on the periphery of the outer ring of the carrier 60. The air cylinder 90 is pivotally mounted on a bracket 98 which may be welded or be otherwise suitably secured to the outer face of post 38. A horizontal slot-like opening 100 in housing 44 provides clearance for the piston rod 92 and bracket 96. The stroke of the air cylinder piston may be made such as to reciprocate the cam carrier 60 through the desired angular movement.

The outer or fixture return rails 54, 56 are preferably made of angle stock and are parallel and of helical configuration having the same helix angle as the inner rails 50, 52. The rails 54, 56 are disposed in the annular space 48 between casings 44 and 46 and are supported by radially spaced arms 106 that are rigidly mounted on the posts 38. The upright legs of the rails 54 and 56 are preferably welded to the arms 106 thus to rigidly support them on the load bearing posts 38.

Positioned between the rails 54 and 56 is a helical-shaped transfer rail 108 having the same helix angle as the ramp rails and rotatable about a vertical helix axis that is coincident with the helix axes of rails 50 and 52. A second spider 110, above the first spider 78, has preferably three radially spaced arms 112 each of which carries a follower or roller 114 that rests respectively on the three cam surfaces 74 of cam carrier 60. The arms 112 project respectively through slot-like openings 115 (see FIG. 1) in casing 44 into the annular space 48. Carried by and depending from each of the arms 112 is a supporting structure for the helical transfer rail 108, each structure including spaced apart vertical supports 116 joined and secured together by a plurality of vertically spaced cross members 118. These cross members 118 support the helical transfer rail 108 and are arranged such that the load of the transfer rail is equally distributed on the three-armed spider 110. As shown in FIG. 1, the transfer rail 108 comprises two spaced apart parallel rail members 109 which may be welded or be otherwise rigidly secured to the cross members 118. It should now be understood that when the cam carrier 60 is rotated in one direction, the spider 112 and the three supporting structures carried thereby will lift the transfer rail 108 and the transfer rail will pick up all of the empty fixtures 32 from the storage rails 54, 56 and will be moved down the ramp to another position upon rotation of the transfer rail 108 in a counter-clockwise direction, as viewed in FIG. 2. In FIGS. 1 and 6, the loaded fixtures 32 are shown on the rails 50, 52 and the unloaded fixtures 32 are shown raised from rails 54, 56. These positions of the two transfer rails 85 and 108 correspond to the positions illustrated in FIG. 9. The outer transfer rail 108, like the inner rail 85, is rotatably reciprocated by an air cylinder 120 which may be pivotally mounted on one of the posts 38.

A limit switch 122 controls the air cylinder 90 and is mounted on the storage unit frame structure (see FIGS. 3, and 9 to 12). Spaced abutments 124 and 126 on the cam carrier 60 are provided to alternately actuate the limit switch 122. Similarly, the air cylinders 96 and 120 are controlled by a limit switch 128 which may be mounted on the storage unit frame structure, as shown, for example, in FIG. 3. On the transfer rail 85 and extending radially outwardly therefrom is a pair of spaced abutments 130 and 132 that actuate the limit switch 128.

Figure 5:
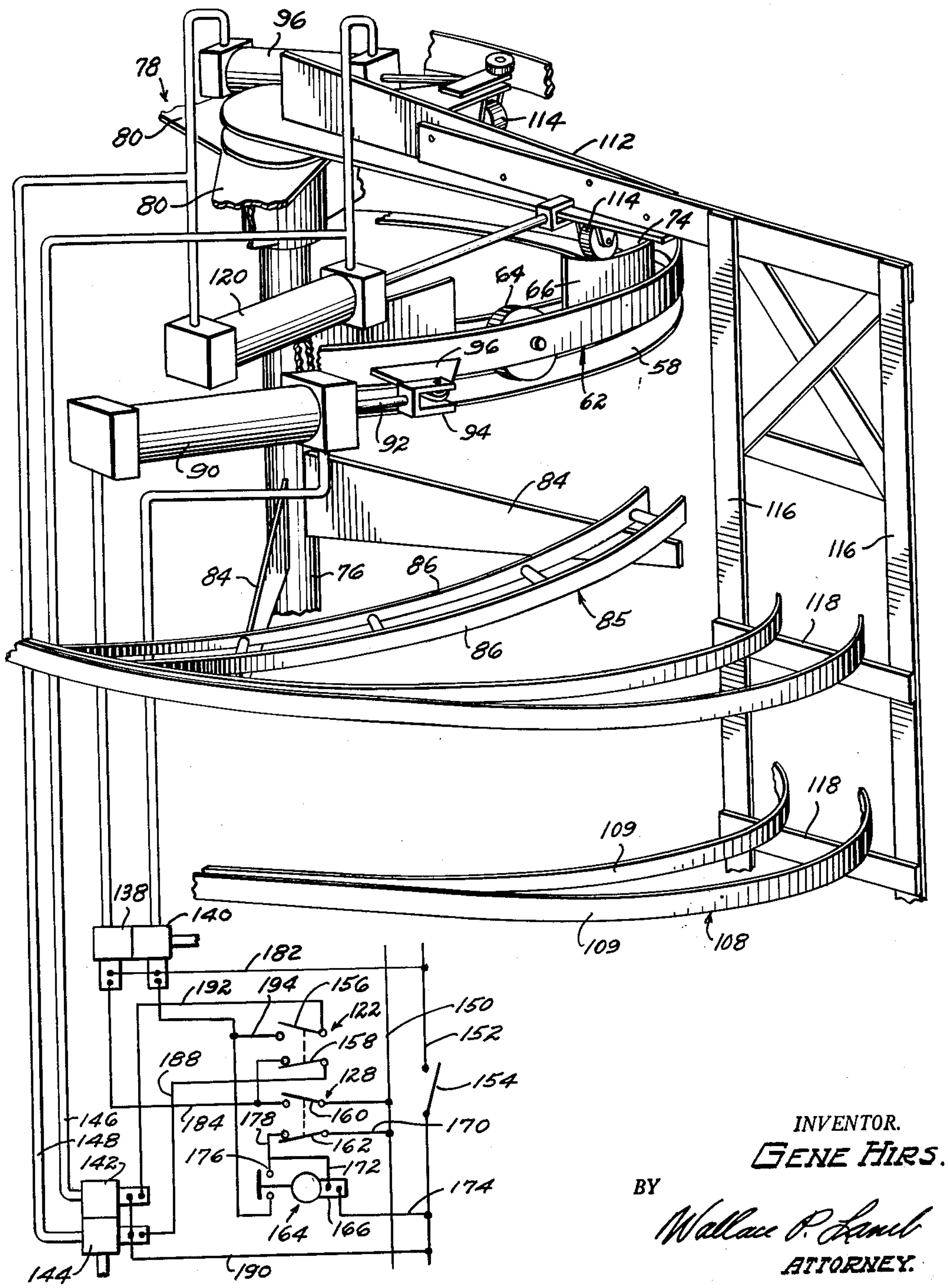
FIG. 5 is a fragmentary perspective view of the apparatus and electrical controls therefor.

With particular reference to FIG. 5 which shows the operating and control system of the feed storage unit 20, the air cylinder 90 is connected by pipes 134 and 136 to a source of compressed air and connected into the pipes 134 and 136 is a pair of solenoid valves 138 and 140. Similarly, a pair of solenoids 142 and 144 are provided respectively in pipes 146 and 148 to control operation of the air cylinders 96' and 120. Pipe 146 connects to the front ends of both of cylinders 96 and 120 and pipe 148 to the rear ends of both of the cylinders. By this arrangement it will be seen that both of the transfer rails 85 and 108 are actuated simultaneously when either of the solenoids 142 or 144 is energized and that the said rails are rotated in relatively opposite directions.

The numerals 150 and 152 designate the main lines from a source of electric power, and in line 152 is represented the conventional line switch 154. Limit switch 122 is represented diagrammatically as comprising two switch members 156 and 158 which are connected together and arranged such that when one is closed, the other is opened. Similarly, the limit switch 128 is represented diagrammatically as comprising two switch members 160 and 162 which are connected together in a manner such that when one of the switch members is closed the other is opened, as illustrated. A timer or time delay switch 164 is provided which includes the usual solenoid coil 166 and switch member 168 movable thereby. As will be more clearly understood from the following description of operation of the control system, the function of the timer 164 is to effect a delay in the start of a cycle of operation of the storage unit so as to insure that the cam carrier 62 returns to starting position before the cycle of operation is repeated. The timer 164 is a relatively slow closing and quick opening switch.

With respect to the circuitry of FIG. 5, one contact of switch 162 is connected by a lead 170 to main lead 150 and the other contact is connected by a lead 172 to one end of the timer coil 166, the other end of which is connected by lead 174 to main lead 152. In parallel with the coil 166 of the time delay switch 164 are the fixed contacts 176, one of which is connected by a lead 178 to lead 172. Also, the time delay switch contacts 176 are in series circuit with switch 162 and the coil of solenoid 140 by leads 178, 180 and 182. The normally open limit switch 160 is in a lead 184 that connects one end of the coil of solenoid 138 to main lead 150, the other end of the coil of solenoid 138 being connected by lead 182 to the main lead 152. The fixed contacts of limit switches 158 and 160 are connected together by a lead 186 and the movable contact 158 is connected by a lead 188 to the coil of solenoid 144 which has the other end of its coil connected by a lead 190 to main lead 152. The lead 190 also connects one end of the coil of solenoid 142 to main lead 152, the coil having its other end connected by a lead 192 to the movable contact 156 of limit switch 122 which has its fixed contact connected by a lead 194 to the lead 180.

*Operation of Storage Unit 20*

Figure 9:
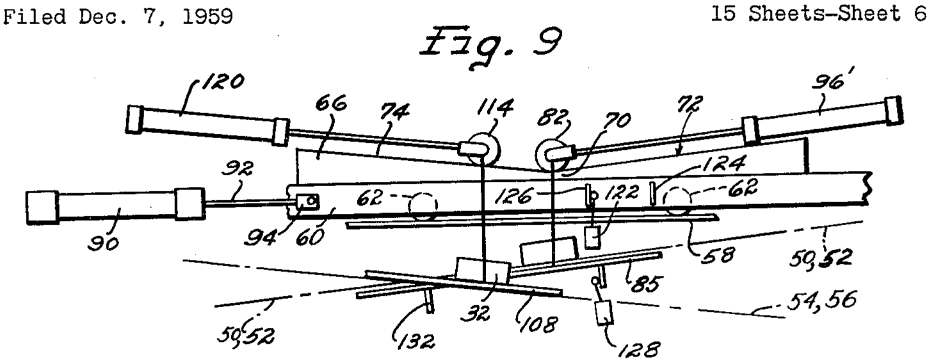
Figure 10:
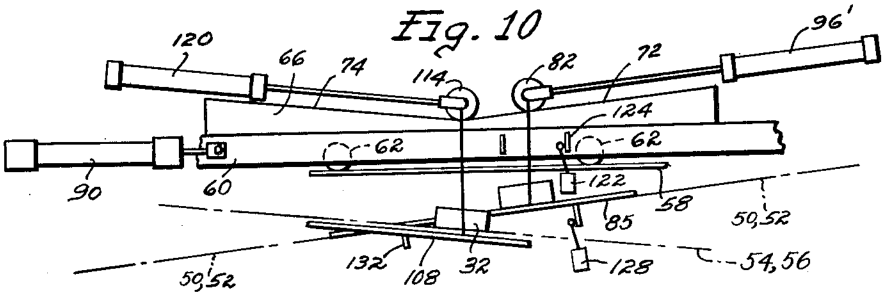
Figure 11:
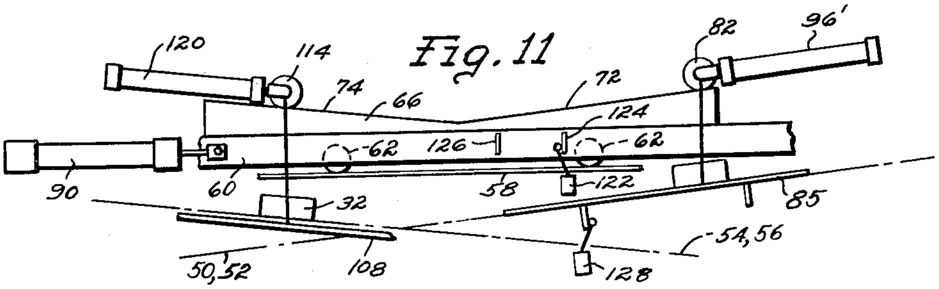
Figure 12:
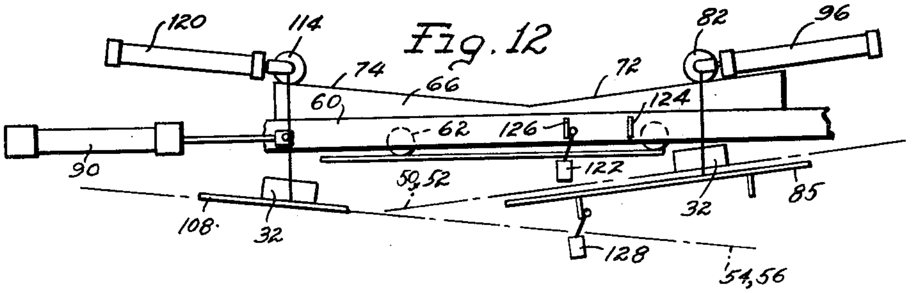

When the line switch 154 is closed, the coil 166 of the time delay switch 164 is energized and after a preset interval switch 168 closes which completes the following circuit of solenoid 140: From main lead 150, through lead 170, normally closed switch 162, lead 178, the now closed time delay switch 168, lead 180, the coil of solenoid 140 and through lead 182 to the other main lead 150. The energizing of solenoid 140 causes the piston of cylinder 90 to be retracted which rotates the cam carrier 62 to the left as viewed in FIG. 5, and also as viewed in FIG. 9. FIG. 9 shows the cam carrier 62 and the transfer rails 85 and 108 in what may be termed their normal positions, or positions they assume during the timing interval of the delayed action switch 164. It will be seen that in the normal positions above referred to the rollers 82 are at the low intermediate points between cams 72 and 74 and as a consequence the inner transfer rail 58 is in its down position which means that the loaded fixtures 32 are at rest on the storage rails 50, 52. The other rollers 114 are resting on the inclined cams 74 at points which hold the fixtures 32 up from the outer rails 54, 56. With these conditions prevailing when the delayed action switch contact 168 closes, the following cycle of operations is initiated: First, the cam carrier 62 is rotated in one direction through a predetermined arc by retraction of the piston of cylinder 90 and as illustrated in FIG. 10, the cams 72 raise the transfer rail 85 to lift the loaded fixtures 32 up from storage rails 50, 52 and at the same time the cams 74 lower the outer transfer rail 108 which sets the empty fixtures down on the return ramp 52. Just prior to completion of its arcuate movement, the abutment 124 on cam carrier 62 engages and trips limit switch 122 which closes switch 156 and opens switch 158. The closing of switch 158 completes the following circuit to energize the solenoid 142 for the purpose of rotating both of the transfer rails 85 and 108: From main lead 150, switch 162, lead 178, the now closed switch 168, leads 180, 194, the now closed limit switch 156, lead 192, the coil of solenoid 142 and through lead 190 to the other main lead 152. Energization of the solenoid 142 causes the pistons of both of the air cylinders 96 and 120 to retract which rotates both the inner transfer rail 85 and the outer rail 108 simultaneously in relative opposite directions to the positions shown in FIG. 11. Since in FIG. 10 only the loaded fixtures 32 were in lifted position when the transfer rails 85 and 108 were rotated to the new positions of FIG. 11, it will be seen that although both transfer rails rotate only the loaded fixtures or those on the inner rails 50, 52 are moved up the rails to the new positions. Just prior to completion of their arcuate movements, abutment 132 on transfer rail 85 trips the limit switch 128 which completes the following circuit to solenoid 138 for the purpose of returning the cam carrier 62 to normal position: From main lead 150, the now closed limit switch 160, lead 184, solenoid 138 and through lead 182 to the other main lead 152. Energization of solenoid 138 activates the piston of cylinder 90 forwardly to return the cam carrier 62 to normal or starting position as shown in FIG. 12. This lowers the transfer rail 85 to deposit the loaded fixtures in the new "up" positions on storage ramp 50, 52 and raises the outer transfer rail 108 to lift the empty fixtures from the storage rails 54, 56. When the cam carrier 62 returned to normal position, FIG. 12, it tripped the limit switch 122 closing switch 158 and opening switch 156. The closing of switch 158 completed the following circuit to energize solenoid 144: From main lead 150 through switch 160 which as shown in FIG. 12 is still closed, through lead 186, limit switch 158, lead 188, the coil of solenoid 144 and through lead 190 to the other main lead 152. The energization of solenoid 144 causes both of the air cylinders 90 and 120 to actuate and return the transfer rails 85 and 108 to their starting positions shown in FIG. 9. On this operation the empty fixtures 32 are moved down the rails 54, 56 to their new positions, but the loaded fixtures are not moved since they were not in raised position. The return movement of the transfer rail 108 trips limit switch 128 closing switch 162 and opening switch 160. The closing of switch 162 completes the circuit of the delayed action switch coil 166 and when switch 168 again closes, the cycle of operations is repeated. It will be seen that rotation of the cam carrier 62 by cylinder 90 sets the empty fixtures down on rails 54, 56 in their new positions down the ramp.

The parts loading station 26 (see FIG. 19) is disposed between and aligned with the lower or feed end of the storage rails 50, 52 and the discharge end of an inclined roller-type conveyor 196 that leads downwardly from ends of the return rails 102, 104. The adjacent ends of the storage rails 34, 38 are preferably additionally supported by uprights 198 that may be welded to and outwardly of the rails 102, 104. Similarly, a pair of oppositely disposed upright supports 200 support the lower end of the conveyor 196. Welded, or otherwise suitably secured to the sides of rails 54, 56 adjacent the supports 198 are inwardly extending angle brackets 202, and similar brackets 204 are secured to the sides of the conveyor 196 at the supports 200. These brackets 202, 204 support thereon a pair of laterally positioned parallel skid rods 206 that are welded to the brackets. As shown in FIG. 19, one of the fixtures 32 is on the rods 206 in position to be loaded. A fixture 32 on returning to the loading station 26 moves down the roller conveyor 196 by gravity and is stopped in the position shown in dot and dash lines by an operator member 208 of a switch 210 which is mounted on the conveyor 196 with the switch operator 208 normally projecting downwardly into the path of the fixture 32. This position of the fixture 32 may be termed the fixture ready position in the sense that the fixture is in position ready to be moved to the parts loading station 26. Normally, the switch operator member 208 is in the position shown in full lines in FIG. 25 and is moved to the dot and dash position by and when a fixture moves into the ready position.

Extending longitudinally of the conveyor between the sides thereof is provided a mechanism, designated, in general, by the numeral 212, to move the fixture 32 from the ready position to the loading station 26 and at the same time to move the loaded fixture 32 from the loading station onto the feed end of the helical storage rails 54, 56. The mechanism 212 is mounted on a horizontal slideway 214 that is supported by standards 216. The slideway 214 is located between the sides of conveyor 196 and the forward end of the slideway terminations adjacent the loading station 26. Slidable on and along the slideway 214 is a reciprocal carrier 218 in the form of a metal block which is connected by a connecting rod 220 to the piston of an air cylinder 222. A transverse shaft 224 extends through the carrier 218 and is fixed thereto against rotation, and pivoted on said shaft is a yoke-shaped abutment member 226, the web of which is positioned forwardly of carrier 218. An abutment member 228 rigidly secured to the web of the yoke 226 extends upwardly and forwardly therefrom to engage the fixture when the carrier 218 is moved to push the fixture to the loading station. The abutment member 228 projects upwardly into the path of travel of fixtures moving down the conveyor 196 and has a cam surface 230 which is engaged by the descending fixture 32 to pivot the yoke 226 to a position to allow the fixture to pass thereover to the ready station. The yoke 226 is pivoted on shaft 224 such that the yoke is unbalanced so as to return to the position shown in FIG. 24 after being released by the passing fixture.

A control or limit switch 232 is provided and this switch and switch 210 mutually control operation of the air cylinder as will be hereinafter more fully understood. The control 232 may be rigidly mounted by means of a bracket 234 on the forwardly disposed standard 216 of the slideway 214. The switch 232 includes a pivoted switch operating arm 236 which preferably carries a roller 238, and the switch operating arm is normally in the dot and dash position shown in FIG. 20. The switch arm is connected to operate a pair of connected together contacts 237, 239 of which the contact 237 is normally open and the contact 239 normally closed (see FIG. 32). A cam member 240 is rigidly mounted on the fixed shaft 224 of carrier 218 and is positioned to engage and move the switch operating arm 236 to the full line position shown in FIG. 20 when the carrier 218 is moved to its foremost position along slideway 214. In FIG. 21, the cam member 240 is shown as it first contacts roller 238 to illustrate that further movement of the cam 240 will depress the switch operating arm to the dot and dash position shown. As will later be more fully understood, switch arm 236 is depressed by cam 240 when carrier 218 moves forward to push a fixture into the load station and that depression of the switch arm 236 initiates return operation of the carrier 218 by control of air cylinder 222.

With reference to the parts fixture 32, this fixture may comprise a bottom sheet metal plate 242 of rectangular shape on which is supported parallel side frames 244 and 246 and spaced partition frames 248 providing a number of storage sections to receive round or cylindrical parts, as at 250. In the interests of durable yet economical construction, the frame members 244, 246 and 248 are preferably made of a heavy gage wire bent into a generally rectangular configuration, the wire structures extending longitudinally of plate 242 and welded to the upper surface thereof. At one end of the fixture 32 which may be considered the rear end of the fixture, there is a cross member 252 that is welded to and rigidly connects the rectangular sides 244 and 246 and the partitions 248 together. Preferably, the cross member 252 is an angle member having a horizontal leg 254 the upper surface of which is traversed by the roller 208 of switch 210 when the fixture is moved into the loading station 26. As shown, the fixtures 32 are placed on the conveyor such that the open ends of the chute sections face outwardly. Each of the fixtures 32 is secured to a base 256 which is constructed to be higher in the front than in the rear so that when seated on the station skid rails 206 and on the storage rails 54, 56, the fixtures will tilt slightly toward the rear to insure that the round parts will not roll out of the fixtures.

*Parts Loading Machine*

The parts loading machine 22 has a support or frame structure including spaced apart posts 260 and oppositely disposed side frame members 262 and 264. As shown in FIG. 13, the side frame members 262 and 264 project into the parts storage unit 20 through the cylindrical casings 46 and 44 and terminate adjacent the loading side of the loading station 26. Mounted on and between the side frame members 262 and 264 there is a tiltable fixture loading chute 266 that is located within the parts storage apparatus 20, between the inner and outer casings 46, 44. Mounted on the frame structure outwardly of the chute 266 is a second and pivotal chute 268 for loading the tiltable chute 266, and outwardly of the second chute there is a third and fixed chute 270 that supplies the parts 30 to chute 268 from a source of supply of such parts. As shown in FIG. 14, the three chutes 266, 268 and 270 are disposed in the same plane, inclined downwardly to the loading station 26 at a sufficient angle of inclination to induce the parts 30 to roll.

The tiltable loading chute 266 is an open ended channel structure of a width equal to that of the parts fixtures 32 and divided by parallel partitions 272 into four channels A, B, C, and D corresponding to the four parts receiving channels of the fixtures. Adjacent its outer end, the chute 266 is tiltably supported on the sides 262, 264 of the frame structure by a transverse shaft 274 which may be welded to the underside of the chute. Normally, the tiltable chute 266 is held in its "up" position shown in FIG. 13 by a power element, such as an air cylinder 278 and piston therein having an upwardly extending rod 280 provided on the upper end thereof with a preferably rounded abutment to engage the underside of the chute 266. A suitable bracket 281 is provided to support the air cylinder 278 on the side members 262, 264 of the frame structure. Also supported by the bracket 281 is a second air cylinder 284, the piston of which carries an upwardly extending rod 286, the upper rounded end of which is normally spaced below the chute 266 to function as a stop to limit tilting of the chute to the dot and dash position designated by the numeral 288 following the retraction downwardly of the rod 280. In the dot and dash position 288, the lower end of the chute 266 is in registry with the open side of the fixture 32 at the loading station. As will be more fully understood hereinafter from the description of operation of the apparatus, the chute 266 is allowed to remain in the position designated 288 until all of the parts have rolled from the chute into the awaiting fixture following which the rod 286 is retracted downwardly to lower the chute 266 to the position designated 289. In this position, any parts which for any reason, may have remained in the chute 266 are discharged into a container 290 below the parts loading station. The air cylinders 278, 284 are respectively controlled by solenoids 289 and 291 (see FIG. 32).

When the tiltable chute 266 is in its normal or raised position, the rollable parts 30 are prevented from rolling out of the chute by stop members 296 which position in and block the channels of the chute, at the discharge end thereof as shown in FIG. 14. In the present construction, the stop members 296 are plates that are secured to a cross member 298 and in edgewise spaced apart relation to clear the partitions 272. The cross member 298 is in turn secured to one end of an adjustment arm 300 that extends longitudinally of and above the chute 266 having the other end thereof secured, such as by welding to a transverse shaft 302 that is rotatably supported by mounting brackets 304 on the opposite frame side members 262, 264. Adjacent the cross member 298, the adjustment arm 300 is supported on the head of a bolt 306 having an adjustment nut thereon supported on a cross member 308 which is secured at the opposite ends thereof to the posts 260. Thus, when the chute 266 is being tilted, the parts 30 are released when they clear the stops 296, and roll into the corresponding channels of the aligned fixture 32 at the loading station.

The return of the tiltable chute 266 to its normal or "up" position is utilized to return switch arm 236 to its normal or "up" position, as illustrated particularly in FIGS. 20 and 21. This is accomplished by mounting an abutment member 301 by means of a suitable bracket 303 on the chute 266, adjacent the discharge end thereof, the abutment member 301 being in the form of an arm arranged to extend into abutting relation with the roller 238 on switch operating arm 236. The abutment arm 301 is pivoted on bracket 303 and extends laterally through a vertical clearance slot in the adjacent side of the conveyor 196 and is normally disposed above roller 238, as shown in dot and dash lines in FIG. 20. On downward tilting of the chute 266, the arm 301 on engaging the roller 238 is caused to pivot on bracket 303 and pass by the arm, but on return of the chute to its "up" position a stop 316 holds arm 310 against pivoting and as a result the switch arm 236 is moved to the dot and dash position shown in FIG. 20.

The chute 268 is an open-ended channel member, one end of which is in registry with an opening 320 in a plate 322 that extends between and is welded to the outer ends of the frame side members 262 and 264. Mounted on the inner side of the plate 322 is a pair of vertically spaced mounting members 324 on which the outer end of chute 268 is pivoted. Welded to the upper edges of the chute sides is a plate 326 to which is welded an upstanding stub shaft 328 that is rotatably received in the upper one of the mounting members 324 and a similar stub shaft 330, welded to the bottom of the chute, is received in the lower one of the mounting members 324. In FIG. 13, the loading chute 268 is shown in registry with channel A of the tiltable chute 266. When the proper number of parts has been delivered to channel A, say five parts for example, the chute 268 is moved to channel B and so on until all of the channels are filled with parts. Movement of the chute 268 is under the control of a counter or stepper switch 332 which is mounted on one side of the chute 270. A normally open parts actuated switch 334 operates the counter device 332 and has an operating arm 336 positioned at the discharge end of chute 270 in the path of the parts being metered to loading chute 268. (See FIGS. 13 and 32.)

At the entrance to chute 268, the fixed chute 270 has a portion of its web omitted to provide clearance for an arcuate parts carrier 337 of a parts dispensing or metering mechanism that is adapted to feed parts singly from chute 270 to chute 268. The carrier 337 is pivoted to the upper end of a link 338 and rocks on a cross bar 340 as a fulcrum to carry a part from the discharge end of chute 270 to the inlet end of chute 268. The lower end of the link 338 is connected to a crank 341 which is fixed to a rotatable shaft 342 that is driven by a suitable pulley and belt drive 344 from an electric motor 345. In FIG. 14, the parts carrier 337 is shown in position receiving one of the parts 30 from chute 270 and it will be seen that when the crank 341 rotates in the direction of the arrow, the carrier 336 will be rocked about fulcrum 340 and deliver the part to the outer end of the chute 268. As the part is moved from chute 270 to chute 268, the counter arm 336 is actuated to record the passage of the part to the chute 268.

An indexing cam 348 is provided to shift the loading chute 268 from one of the channels of chute 266 to the next during the loading operation and is actuated by an air cylinder 350 under control of the counter switch 332. The cam 348 is fixed on a rotatable shaft 352 which is supported by a mounting 354 that is rigidly secured to the inner side of the frame structure side member 264. Extending longitudinally of and below the chute 268 there is a cam follower 356 in the form of an arm which is fixed at one end thereof to shaft 328 and thus moves with the chute 268. The free end of the arm 356 preferably carries a roller 358 to engage the periphery of the indexing cam which has a number of spaced notches therein for aligning the discharge end of chute 268 successively with the channels of the chute 266. In the present instance there are eight of the notches, or twice as many notches as there are channels in chute 266. As will later in the description be more fully understood, the design of the indexing cam is such that the chute 266 is loaded with parts starting alternately with channels A and D.

Fixed to the indexing cam shaft 352 is a ratchet or star wheel 360 that is operated by a pawl 362, carried by the piston of air cylinder 350. The air cylinder 350 is pivoted at its outer end on a bracket 364 that is rigidly secured to the side frame member 262 and the pivotal motion of the air cylinder and pawl is controlled by the usual link 365 that pivotally connects the pawl to the shaft 352. Reciprocation of the piston of air cylinder 350 is controlled by the usual solenoid 346 which in turn is controlled by the counter switch 334 (see also FIG. 32). Mounted on the side member 262 and laterally positioned with respect to the air cylinder 350 is a counter reset switch 366 for returning the counter switch 332 to home position following the counting out of five parts, or the filling of one of the channels of chute 266. To this end, the counter reset switch 366 is actuated each time that the chute 268 is moved to the next channel of chute 266. This is accomplished by providing an abutment member 272 on the pawl in position to strike and close the reset switch 366 as the pawl moves to shift the chute 268 into registry with the next channel of chute 266.

Referring now more specifically to the indexing cam 348, the eight notches in the cam periphery have been designated respectively by the numerals 1 to 8 and it is to be understood that notches 1 and 8 are the same axial distance from the center of the cam axis and that likewise the notches 4 and 5 are the same axial distance from the cam axes but, of course, a different distance than the distance of notches 1 and 8 from the cam axis. Assuming now that chute 268 starts the loading operation at position A and is shifted successively until it reaches channel D which means that roller is now in notch No. 4, the required five parts are counted out for channel D and as a consequence, air cylinder 350 rotates the cam to notch No. 5 but since the cam notch No. 5 is the same as cam notch No. 4, the chute 268 remains in registry with channel D in position to again load the chute, starting with channel D. The same condition occurs when the chute 268 reaches the channel A position so that chute 268 is loaded starting alternately with channels A and D.

An extension member 372 of the bracket 364 supports a limit switch 374 having a pair of normally closed contacts 375 and a pair of normally open contacts 376. The movable ones of the limit switch contacts are carried by an operating arm 377 that is positioned for actuation by one or the other of a pair of abutment members 378 and 380 which are carried by the indexing cam 348. The abutment members 378 and 380 are diametrically oppositely disposed on the cam 348 with respect to shaft 352 and depend from the underside of the cam. The abutment member 378 actuates the limit switch 374 following completion of the filling of the chute 268 at the D channel and the other of the abutment members 380 actuates the switch 374 following completion at channel A of the filling of chute 268 with parts. The limit switch 374 and limit switch 210 cooperate in mutually controlling the solenoid of cylinder 276 and thus controlling the tilting of the chute 266. It will be understood that actuation of the limit switch 210 assures that there is a fixture 32 at the loading station 26, and actuation of switch 374 assures that the chute 266 has been filled with parts, and that these two conditions must be fulfilled before the chute 266 can be tilted.

The operating arm of the limit switch 374 is returned to its normal or down position by and when the chute 266 is returned to its normal or up position. To accomplish this, the chute 266 carries an extension member 361 on which is mounted an abutment arm 363 positioned to engage and move the operating arm of switch 374 back to normal position. When the chute 266 is tilted to discharge the parts therefrom, the arm 363 pivots to clear the switch operating arm and passes above arm 363, but on return of the chute 266 to its "up" position the abutment arm 363 engages and moves the switch operating arm in a direction to open the switch, the arm being held against pivoting on extension 361 by a stop 365.

In addition to the timer 349, there is provided a timer 376 and a second timer 378 which together with a relay 380 control the solenoids 289 and 291 respectively of the air cylinders 278 and 284. The air cylinders 278 and 284 are connected by the usual air conducting conduits to the solenoids 289 and 291 respectively, and the air cylinder 222 is preferably connected in series with solenoid 291 and air cylinder 284, as shown. The timer 376 has a switch including a pair of normally closed contacts 382 and similarly the switch of the timer 378 has a pair of normally closed contacts 384. Relay 380 has a pair of normally open contacts 386 and a second pair of normally open contacts 388.

In FIG. 32, the mechanism of the counter switch 332 is diagrammatically illustrated as comprising a stepper switch 390 and a plurality of radially spaced fixed contacts designated 0 to 6 respectively, these contacts being mounted on a dielectric disc member 392. Fixed to the same shaft to which the stepper switch 390 is fixed is a ratchet wheel 394 that is step rotated by a pawl 396 pivoted to one end of the armature of a solenoid 398 that is pulsed to actuate the pawl. A link connected at one end thereof to the pawl 396 follows a cam 400 to guide the pawl such that at the end of each stroke, the pawl will be disengaged from the ratchet wheel 394, as shown. Fixed to and concentric with the ratchet wheel 394 is a gear 402 in mesh with a gear rack 404 which is operable to rotate the gear 402 in a direction to return the stepper switch 390 to home position. A solenoid 406 is energizable to rotate the gear rack. The stepper switch 390 controls a relay 407 having a pair of normally closed contacts 408 and a pair of normally open contacts 410 by means of which the stepper switch 390 respectively controls motor 332 and timer 349 which is hereinafter more fully described. The stepper switch 390 is connected by a lead 389 to the main line 412 and contact No. 5 is connected by a lead 391 to relay 407 which is connected by lead 393 to lead 419 and thus to main line 414.

The numerals 412 and 414 respectively designate main electric leads, and in lead 412 there is the usual line switch 416. Both of the fixed contacts of the limit switch 374 are connected by leads 418 and 419 to main lead 414, and connected to the movable contact 376 of the limit switch 374 are four parallel circuits. One of these parallel circuits is the circuit of drive motor 345 and includes leads 420 and 422 to one of the counter switch contacts 408 and a lead 424 which connects the other of the contacts 408 to one terminal of motor 345. The other terminal of motor 345 is connected by a lead 426 to the main line 412. The second of the parallel circuits from limit switch contact 376 includes the part actuated switch 334, a lead 428 that connects the fixed contact of switch 334 to one end of the coil of solenoid 398, and a lead 430 that connects the other end of the coil to lead 426 and thus to the main lead 412. The third of the parallel circuits from limit switch contact 376 is for the coil of the counter reset solenoid 406 and includes a lead 432 that connects limit switch contact 376 to the movable contact of the counter reset switch 366, and a lead 434 that connects the fixed contact of switch 366 to one end of the reset solenoid coil 406, the other end of coil 406 being connected by a lead 436 to the main line 412. The fourth parallel circuit from the limit switch contact 376 is through leads 420, 422 and the normally open counter contacts 410, one of which is connected by leads 438 and 440 to one end of the coil of timer 349, the other end of the coil being connected by a lead 442 to main lead 412. The lead 438 also connects to one of the timer contacts 357, the other of which is connected by a lead 444 to one end of the coil of the solenoid 346 which has its other end connected by a lead 446 to main lead 412. Thus, the solenoid 346 of the air cylinder 350 that moves the parts fixtures 32 is in parallel circuit with the coil of timer 349.

A lead 448 connects the normally open limit switch contact 375 to the normally closed contacts 239 which are connected by a lead 450 to the normally open, fixture operated limit switch 210 which is connected by a lead 452 through the normally closed timer contacts 382 and relay coil 380 to main line 412. The normally open contacts 237 of switch 232 are connected to main line 414, and by a lead 454 to a lead 456 which connects together corresponding ends of the coils of timers 376 and 378 which are both connected to the main line 412. Also, the normally open contacts 237 of switch 232 are connected by a lead 458 to the normally closed contacts 384 of timer 378, and timer contacts 384 are connected by a lead 460 through the coil of solenoid 289 to main lead 412 by a lead 462. Leads 464 and 466 respectively connect the relay contacts 386 to leads 452 and 466, and leads 468 and 470 respectively connect the other pair of relay contacts 388 to main line 414 and to one end of the coil of solenoid 291 which is connected by lead 462 to the main line 412.

*General Operation—Parts Loading Machine*

Assuming that there is a loaded parts fixture 32 at the loading station 26 and an empty fixture at the fixture ready position holding switch 210 closed and that line switch 416 is closed, the motor 345 drives the parts metering mechanism and the parts are transferred singly by the parts carrier 337 from supply chute 270 to the loading chute 268 which it is assumed is in the position shown to direct parts first into channel A of the dump chute 266. The parts being transferred to chute 268 by carrier 337 actuate the counter operating arm 336 of switch 334 and when the predetermined required number of parts has been supplied to channel A, the counter stops motor 345 and activates solenoid 350 to index the loading chute 268 to register with channel B. The indexing of the loading chute 268 to the "B" channel actuates switch 366 to reset the counter switch mechanism 332 and restart motor 345. This operation is repeated until all of the channels of the chute 266 are filled. When the chute 268 is indexed to register with channel D, the chute actuates switch 374 which activates the air cylinder 222. This moves the fixture pusher 218 to push the empty fixture to the loading station 26 and at the same time push the previously loaded fixture from the loading station 26 onto the feed end of the storage apparatus rails 54, 56. The limit switch 232 is actuated by the fixture pusher 218 as the latter approaches the end of its stroke and causes the pusher 218 to be retracted following actuation of timer 376. Also the air cylinder 278 is activated and retracts rod 280 to allow the chute to tilt to the position 288 to which it is limited by the upper end of rod 286 of air cylinder 284. In this position, the parts roll out of chute 268 into the awaiting empty fixture. Following the parts loading operation, rod 286 is again retracted to allow the chute 268 to tilt further to position 289′ in which any parts that may have been left in the chute are dumped into the container 290. The air cylinder 278 is then activated to return the chute 268 to its "up" or normal position, during which movement the chute resets switch 232. The parts metering operation is resumed, but the chute 268 cannot be dumped unless there is a fixture at the ready position holding switch 210 closed.

*Detail Description—Parts Loading Machine*

Assuming that there is an empty fixture 32 at the ready position holding the switch 310 closed and that line switch 416 is closed, the electric motor 345 will be energized, the circuit of the motor being as follows: From the main lead 414, leads 419 and 418, the normally closed contacts 376 of switch 374, leads 420, 422, the normally closed contacts 408 of the counter controlled solenoid 407, lead 424, motor 345 and lead 426 to the other main lead 412. Driven by the motor 345, the parts transfer carrier 337 singly transfers parts from chute 270 to chute 268 which is positioned to first load parts into channel A of the fixture loading chute 266. As the parts are transferred from chute 270 to chute 268 they strike and actuate switch arm 336 which closes contact 334 and pulses the solenoid 398 of the counter operating switch 332. The circuit of solenoid 398 is from the closed contact 376 of switch 374, lead 420, the parts actuated switch 334, lead 428 and solenoid 398 to lead 426 and thus to main lead 412. Each time that solenoid 398 is pulsed, the pawl 396 is actuated thereby and rotates the ratchet wheel and stepper switch 390 carried thereby one step or to the next contact which is, of course, representative of the transfer of one part from chute 270 to chute 268. When the stepper switch 390 reaches the number of parts counter for which the switch is set, which in the diagrammatic illustration of FIG. 32 is five parts, then a circuit to the relay 407 is completed as follows: From the main line 412, lead 289, the now closed contacts 390 and contact No. 5, lead 391, solenoid 407 and leads 393 and 419 to the other of the main line 414. The closing of this circuit by the stepper switch 390 energizes relay 407 which opens its contacts 408 to stop motor 345 and closes its contacts 410 to close a circuit through the timer 349. The timer circuit is from the closed switch 376, leads 420, 422, the now closed relay contacts 410, leads 438, 440, timer 349 and lead 442 to main lead 412. The timer 349 delays the closing of its contacts 357 for an interval calculated to insure that the fifth part has rolled from the loading chute 268 into channel A of the fixture loading chute 266 and then closes contacts 357 to energize solenoid 346 of the air cylinder 350. The air cylinder 350 then operates its pawl 362 to rotate cam 348 to the next notch whereby to pivot the loading chute 268 so that the discharge end thereof is in registry with channel B of the fixture loading chute 266. As the pawl 362 is retracted in rotating the cam 348, the abutment member 368 carried by the piston rod of cylinder 350 engages and closes switch 366 which completes the following circuit to the counter reset solenoid 406. From switch 376, lead 432, switch 366, lead 434, solenoid 406 and lead 436 to main line 412. Energization of the counter reset solenoid 406 returns the stepper switch 390 to its home or starting position. The above operations are repeated in the filling of each of the channels B, C and D and when the loading chute 268 is moved to register with channel D, the chute strikes and actuates switch 374 which closes contacts 375 and opens contacts 374. The closing of contacts 375 closes the following circuit of relay 380: From contacts 375, lead 448, contacts 239, switch 210 held closed by a fixture at the fixture-ready position, lead 452, the normally closed contacts 382 of timer 376 and relay 380 to the main line 412. The energization of relay 380 closes the relay contacts 388 and the relay holding contacts 386. The closing of relay contacts 388 completes the following circuit to energize the solenoid 291: From the main line 414 through lead 468, the now closed relay contacts 388, lead 470 through solenoid 291 and lead 462 to the other main line 412. The holding circuit for relay 380 is from the now closed contacts 375, leads 448 and 466, relay contacts 386, lead 464, timer contacts 382 and through relay 380 to main lead 412. This holding circuit is provided to maintain relay 380 energized following the subsequent opening of contacts 239 of switch 232 thus placing timer 376 in sole control of relay 380. Energization of solenoid 291 by the aforementioned closing of relay contacts 388 activates the air cylinder 222 which then operates to push the fixture at the ready position to the loading station 26 and at the same time pushes the previously loaded fixture onto the feed end of the storage unit rails 54, 56. Also, the air cylinder 284 is activated, but as before mentioned this has no effect other than to raise its rod 286 to the position shown in dot and dash lines, designated 288. When the forwardly moving fixture pusher 218 approaches the end of its forward stroke, the abutment member 240 carried thereby strikes and actuates switch 232 which opens contacts 239 and closes contacts 237. However, the relay 380 remains energized through its holding contacts 386 so that the fixture pusher 218 remains in its forward position and rod 286 in its raised position. When the contacts 237 were closed by the fixture pusher 218, the following circuit of the timer 378 was closed: From the main line 414, the now closed contacts 237, lead 454, through the coil of timer 378 and lead 438 to the other main line 412. Also, the closing of switch contacts 237 closed the following circuit through timer contacts 384 to the solenoid 289 of air cylinder 278. From the main line 414, contacts 237, leads 454, 458, timer contacts 384, lead 460 and through solenoid 389 and lead 462 to the other main lead 412. The air cylinder 278 is then activated and retracts its rod 280 which allows the fixture loading chute 266 to tilt and dump the parts 30 into the awaiting empty fixture at the loading station 26, the tilting of the chute being limited by the rod 286 in its upper position as illustrated in FIG. 14 and designated by the numeral 288. Timer 376 now opens its contacts 382 which opens the relay contacts 386 and 388 by deenergization of relay 380 and deenergizes solenoid 291. This causes air cylinder 222 to retract the fixture pusher 218 to its starting position and causes air cylinder 284 to retract its rod 286 to allow the loading chute 266 to tilt to its lowermost position shown so as to discharge any parts which may have remained therein into the container 290. As the chute 266 pivots to its lowermost position, the pivoted abutment 301 carried thereby pivots past the switch 232 in position to reset the switch upon return of the chute to normal position. Also when the chute 266 is tilted, the pivoted abutment 362 carried rearwardly thereof is pivoted past the switch 374 in position to reset the switch by and during return of the chute to the "up" or normal position thereof. Thus, when timer 378 opens its contact 384, the air cylinder 278 is activated to move the chute 266 to its normal position and reset switches 232 and 374 which deenergizes the circuits of the timers 376 and 378 and the relay 380 until the next loading operation when switch 374 is again closed by movement of the fixture loading chute 268 to the final channel to be filled of the loading chute 266. The next loading operation will start with channel D and the channels will be filled in the reverse order, but the operation otherwise will be the same as above described.

*Parts Unloading Machine*

Referring now to FIGS. 27 to 31 inclusive, there is a roller-type conveyor 450 that connects the upper ends of the inner storage rails 50, 52 with the upper ends of the outer storage rails 54, 56 down the latter of which empty fixtures return to the parts loading station. The conveyor 450 has a straight inclined portion down which the loaded fixtures move by gravity to the unloading station 28 where a retractable stop member 452 is movable to a position to stop the fixture such that the open end of the fixture is in registry with the upper end of a fixed chute 454. The stop member 452 may be located beneath the conveyor 450, as shown, for movement vertically from a lower retracted position to an upper raised position in the fixture path of travel. A power element, such as an air cylinder 456, and piston therein may be used to raise and lower the stop member 452 which may be secured to the upper end of a vertical rod 458 that is carried by the piston of the air cylinder 456. The air cylinder 456 is mounted by means of a bracket 460 on the conveyor structure. In the usual manner, the air cylinder 456 is connected by conduits to a source of compressed air and is controlled by a solenoid 461.

A second air cylinder and piston unit 462 is mounted on the inner side of the conveyor structure 450 by a suitable bracket 464 and is adapted to engage and raise the inner end of the fixture at the proper time to tilt the fixture, as shown to discharge the parts 30 into chute 454. A vertical rod 466, carried by the piston of the air cylinder 462 has secured to the upper end thereof an abutment member or bar 468 that extends longitudinally of the unloading station to engage the underside of the fixture near the inner end thereof. At each of its opposite ends, the bar 468 has an upstanding retaining flange 470 to receive and cradle the fixture therebetween, the retaining flanges preferably being tapered as shown in FIG. 33. A solenoid 471 in the compressed air lines of air cylinder 456 controls in the usual manner the direction of movement of the air cylinder piston.

Mounted on the conveyor structure by a bracket 472 is a normally open limit switch 474 having an operating arm 476 that preferably carries a roller for engagement by a fixture moving into the parts unloading position. As will be understood more fully from the hereinafter described circuitry, the limit switch 474 controls operation of the fixture stop member 452 and also the tilting operation of the fixture.

Normally closing the upper end of the chute 454 is a vertically movable gate 476 which is secured to the lower end of a rod 478 that is carried by the piston of an air cylinder unit 490. The air cylinder is mounted by means of a bracket 482 on the sides of the chute 454 adjacent the upper end of the chute. When the fixture at the unloading station 28 is tilted as shown in FIG. 28, the outer ends of the wire separator members of the fixture bears against the adjacent face of the gate as a fulcrum. A solenoid 483 controls the direction of operation of the piston in air cylinder 480.

The chute 454 is divided by spaced apart partitions 484 into four parts receiving channels *a*, *b*, *c*, and *d* which correspond and align with the four channels in each of the parts fixtures. In order to unload the parts and feed them by gravity into a single channel fixed chute 486, the multiple chute channel is tapered at its lower end and provision is made to empty the channels *a*, *b*, *c*, and *d* successively to avoid a jamming of parts at the entrance to chute 486. To accomplish this, the chute 454 is provided near the tapered end thereof with a plurality of individually operable gates 488 that are respectively positioned in the channels *a*, *b*, *c*, and *d*. These gates 488 are fixed to spaced, sleeve bearings 489 that are rotatable individually on a cross shaft 490 that is secured to oppositely disposed mounting plates 492 which are in turn secured to the opposite sides of the chute 454 (see FIGS. 29, 30 and 31). The shaft 490 is adjacent the bottom wall of chute 454 wherein a clearance opening 492 is provided so that the gates 488 can extend upwardly through the bottom of the chute into the channels *a*, *b*, *c*, and *d* to intercept the parts 30 as they roll down the chute channels after gate 476 is raised. Each of the gates 488 is biased toward closed position by a spring 494.

Below and parallel with shaft 490 is a second shaft 496 that is journaled for rotation on the mounting plates 492. Fixed to the shaft 496 is four radially extending actuating pins 498, that are axially spaced along the shaft in positions for respectively striking and holding the gates 488 open. As shown in FIG. 30, the pins 498 are radially spaced equally with regard to five radial divisions but one pin is omitted to provide a home position of shaft 496 in which all of the gates are open as shown. Fixed to one end of shaft 496 is a ratchet wheel 500 having five teeth to turn shaft intermittently to five positions in each of which, except the home position, one of the pins opens its gate 488 for an interval calculated to empty the corresponding channel of chute 454. A pawl 502 is actuated by the piston (not shown) of an air cylinder 504 that is controlled by a solenoid 506 (see FIG. 33). The air cylinder 504 is of a conventional type and may be pivoted at one end thereof to a mounting bracket 508 that may be rigidly secured to the underside of chute 454 starting from the home position of shaft 496. It should now be evident that each time the air cylinder 504 is activated, the five-toothed ratchet wheel 500 is rotated through an angular distance such that the pins 498 successively strike and hold the gates open each for an interval of a duration depending upon the intervals of activation of air cylinder. Fixed to the other end of shaft 496 to rotate therewith is a cam abutment member 510 which, when the chute 454 is empty of the parts 30, is in position to hold an operating arm 512 of a limit switch 514 in the raised or normal position shown in FIG. 31. The limit switch 514 is mounted on the adjacent side of the chute 454 and as will be more fully understood from the hereinafter description of operation, the switch 514 controls the dump gate 476 so that the gate will not be raised unless the chute 454 is empty. A limit switch 516 is mounted by means of a bracket 518 on the same side of the chute 454 as the pawl 502 and carried by the pawl is an extension arm 520 that operates and closes the switch 516 on each return stroke of the pawl.

Referring now to the parts unloading machine control system and circuitry of FIG. 33, the diagrammatic representation includes the usual main electric power lines 522 and 524 and in line 524 is the usual line switch 526. As previously mentioned, the fixture operated switch 474 initiates operation of solenoid 461 to effect movement of the fixture stop member 452 to stop the fixture in unloading position and also initiates operation of the solenoid 471 to effect tilting of the fixture. The circuit of the switch 474 includes a lead 528 from the main line 524 to one of the switch contacts and a lead 530 from the other of the contacts to a relay 532 that is connected by a lead 534 to the other main line 522. The closing of the fixture actuated switch 474 closes another circuit which includes lead 528 from main line 524, switch 474, a lead 536, the normally closed contacts 538 of a delayed action relay or timer 540, a lead 542 to one terminal of a second delayed action relay or timer 544, and a lead 546 from the other terminal of timer 544 to main line 522. In parallel with the coil of the timer 544 is a relay 548 having two pair of normally open contacts 550 and 552. One of the pair of relay contacts 550 is connected by leads 554, 556 and lead 546 to main line 522, and the other of the pair of relay contacts 550 is connected by a lead 558 to the coil of solenoid 461 which coil is connected by a lead 560 to the main line 524. Thus, when the fixture activated switch 474 is closed, relay 548 is energized and in turn energizes solenoid 461 and as a consequence the air cylinder 456 raises stop 452 to intercept the approaching fixture at the unloading station 28. The timer 544 has a pair of contacts 562 in a lead 564 that connects one terminal of the solenoid 471 to main line 524, the other terminal of the solenoid 471 being connected by a lead 566 to the other main line 522. After a short interval following the energization of relay 548, the timer closes its contacts 562 which energizes solenoid 471 to activate the air cylinder 462 which then tilts the fixture to the position shown in FIG. 28.

A lead 568 connects one of the contacts 552 of relay 548 to one terminal of the solenoid 483 of the gate activating air cylinder 480 and a lead 570 connects the other terminal of solenoid 483 to main line 522. From the other of the contacts 552 of relay 548, a lead 572 connects to one of a pair of normally open contacts 574 of relay 532. From the other of the contacts 574 of relay 532, a lead 576 connects to the normally closed contacts 578 of switch 514 which contacts are also connected by a lead 580 to main line 524. Thus, when the fixture operated switch 474 is closed, relay contacts 552 and relay contacts 574 will be closed and if the chute 454 is empty, switch contacts 578 will be closed and the following circuit will be completed simultaneously with the tilting of the fixture at the parts unloading station: From main line 522, through lead 570, solenoid 483, lead 568, the now closed contacts 522, lead 572, the now closed contacts 574 of relay 532, lead 576, the closed contacts 578 of switch 514, and lead 580 to the other main lead 524.

The contacts 578 of the switch 514 have connected in parallel therewith, by leads 582 and 584, a pair of normally open contacts 586 of a relay 588 to maintain a closed circuit to timer 540 and solenoid 483 during the time when contacts 578 are open. The time that it takes to unload all of the parts from chute 454 is controlled by the timer 540 which has the following circuit: From the main line 522 through a lead 590 to one end of the coil of timer 540 and from the other end of the coil through leads 592, 594, the normally open contacts 574 of relay 532, and through leads 596, 576, contacts 578 and lead 580 to the other main line 524, or from the relay contacts 574 through lead 582, relay contact 586 and lead 584 to main line 524. One end of the coil of relay 588 is connected by a lead 598 to main line 522 and the other end of the coil is connected by a lead 600 in series with the contacts 578 of switch 514. This circuit is as follows: From main line 522, through lead 598, relay 588, leads 600, 594, relay contacts 574, lead 576, switch contacts 578 and lead 580 to the other main lead 524.

The timer 540 has a second pair of contacts 602 connected to main line 524 by a lead 604 and in series circuit with the coil of the solenoid 506 by leads 606 and 608 to main lead 522. In parallel with the contacts 602 of the timer 540 is the coil of a timer 610, a pair of normally open contacts 612 of the limit switch 516 and a pair of normally closed contacts 614 of the timer 610. The coil of the timer 610 is connected by a lead 616 to main line 522 and by a lead 618 to one of the limit switch contacts 612, the other contact 612 of which is connected by a lead 620 in series with the coil of solenoid 506 to main line 522 by a lead 623. The switch 514 has a second pair of contacts 622 that are normally open and connected in parallel with the coil of timer 610 and the contacts 612 of limit switch 516. One of the contacts 622 of switch 514 is connected by a lead 624 to lead 580 and thus to the main line 524. The other of the contacts 622 is connected by a lead 626 and a lead 628 to the contacts 614 of timer 610 and thus in series with the solenoid 506 of the air cylinder 504.

*General Operation—Parts Unloading Machine*

When a parts fixture 32, entering the parts unloading station 28, strikes and actuates switch 474, the stop member 452 is automatically actuated to stop the fixture in proper aligned relationship with the unloading chute 454. At the same time, the closing of switch 474 initiates the parts unloading cycle of operation by the energization of timer 544 which after a short interval acts to activate the air cylinder 462 which then tilts the fixture, as shown in FIG. 28. If at this time the chute 454 is empty of parts, the gate 476 will be opened and the parts will roll out of the fixture 32 into the channels of the chute 454. After an interval determined by timer 544 to allow for the parts to roll from the fixture into the chute 454, the interval on timer 540 ends and the air cylinder 462 is activated to lower the fixture 32 and air cylinder 456 is also activated to retract the stop member 452 whereupon the fixture rolls by gravity down to the fixture ready position at the parts loading station 26. Also, the timer 540 causes the air cylinder 504 to be activated which then operates the pawl 502 to open the first of the gates 489. This operation is repeated until all of the channels are empty whereupon the contacts of switch 514 are returned to the normal position shown in FIG. 33.

*Detail Description*

When a loaded fixture entering the unloading station 28 strikes and closes the switch 474, the following control circuit is closed to energize relay 532. From the main line 524, through the now closed switch 474, relay 532, lead 534 to the other main lead 524. Also, when switch 474 is closed by the fixture moving into the unloading station 28, the following circuit is closed: From the main line 524, lead 528, switch 474, lead 536, the normally closed contacts 538 of timer 540, lead 542, the coil of timer 544 and lead 546 to the main line 522. The timer 544 is energized and upon expiration of the interval for which it is set will close its contacts 562. Also energized is a circuit in parallel with timer 544 including the relay 548 and lead 556, the energization of relay 548 closing both pair of its normally open contacts 550 and 552. The closing of the relay contacts 550 closes a circuit to activate the solenoid 461 of air cylinder 456 and raise stop member 452 to stop the fixture in alignment with chute 454. The circuit of solenoid 461 includes a lead 560 from main line 524, the coil of solenoid 461, lead 558, the now closed relay contacts 550 and leads 554 and 546 to the other main line 522. Soon after the stopping of the fixture by the stop member 452, the timer 544 completes the interval for which it is set and closes its contacts 562 which completes a circuit that includes the lead 566 from main line 522, through the coil of solenoid 471, lead 564 and the now closed timer contacts 562 to the other main line 524. The closing of this circuit activates solenoid 462 which then tilts the fixture, as illustrated in FIG. 28. At the same time, the unloading gate 476 is raised provided that the contacts 578 of switch 514 are closed which is the case when the chute 454 is empty of parts. The circuit of the solenoid 483 of the gate operating air cylinder 480 is as follows: From the main line 522, through lead 570, the coil of gate solenoid 483, lead 568, the now closed contacts 552 of relay 548, lead 572, the now closed contacts 574 of relay 532, lead 576, the now closed contacts 578 of switch 514 and lead 580 to the other main line 524. Also energized is a circuit of the relay contacts 586 that parallels switch contacts 578 to maintain the timer 540 and gate solenoid 483 energized when the contacts 578 subsequently open. This circuit is from the main line 524, through lead 584, the now closed contacts 586 of relay 588, lead 582, the now closed contacts 574 of relay 532, lead 572, the now closed contacts 552 of relay 548, lead 568, the coil of gate solenoid 483, and lead 570 to the other main line 522. The timer 540 is set to operate after an interval calculated to allow sufficient time for all of the parts to roll from the tilted fixture into the chute 454 whereupon the timer 540 opens its contacts 538 and closes its contacts 602. Upon the opening of timer contacts 538, relay 548 is deenergized which in turn deenergizes the timer 544 and also the stop member solenoid 461. When this happens, the timer 544 now closed quickly opens to deenergize solenoid 471 which activates air cylinder 462 to lower the rear end of the fixture and at the same time solenoid 461 is deenergized which activates the air cylinder 456 to retract the fixture stop member 452. The empty fixture now moves by gravity down to the ready station for reloading by the parts loading machine. The closing of the other set of contacts 602 of timer 540 closes the following circuit to energize the solenoid 506 of cylinder 504: From main line 524, through lead 604, the now closed contacts 602 of timer 540, lead 606, the coil of solenoid 506, and lead 622 to the other main line 522. The solenoid 506 is now energized and activates the air cylinder 504 which then retracts the pawl 502. This rotates shaft 496 (FIGS. 29 and 30) a distance to open the first of the gates 488 and at the same time abutment pin 510 (FIG. 31) trips switch 514 to open the switch contacts 578 (FIG. 33) and close contacts 622. The closing of contacts 622 allows the chute gates 488 to open sequentially and the circuit of contacts 622 is as follows: From main line 524, leads 580, 624, the now closed contacts 622 of switch 514, leads 626, timer contacts 614, lead 620, lead 606, solenoid 506, and lead 623 to main line 522. Actuation of the pawl 502 by cylinder 504 now actuates switch 516 which energizes timer 610 and opens the circuit of solenoid 506. This sequence of operation continues until all gates have been opened and parts allowed to roll out after which a final sequence of operation returns switch 514 to the normal or starting position shown in readiness for the arrival at the unloading station of the next loaded fixture.

I claim:

1. In a parts handling and storage apparatus, a ramp having a feed end, a conveyor having a discharge end disposed toward and spaced from the feed end of said ramp, a parts loading station structure interposed between and connecting the discharge end of said conveyor to the feed end of said ramp, a fixture movable on and along said conveyor toward said loading station, a first switch disposed along said conveyor actuated by and operable to stop said fixture anterior to said loading station, power means operable to move said fixture past said switch onto the loading station, a tiltable parts loading chute operable to tilt from a normal loaded position to a position to discharge the parts into the fixture at the loading station, a second switch operable when said chute is completely loaded with parts, said first and second switches mutually controlling said power means, and a third switch actuated by said power means upon moving of said fixture into the loading station controlling tilting of said chute.

2. In a parts storage apparatus, a helical storage ramp having an inlet end, a return ramp having a declining discharge end portion, a loading station between and connecting the return ramp to the storage ramp, a fixture adapted to move down said inclined end portion toward said parts loading station, a switch actuated by and stopping said fixture in a position anterior to said loading station, a normally inactive actuator operable to move said fixture to the loading station, a parts loading chute at said loading station operable to discharge parts into fixture when the latter is at the loading station, means operable to load the chute, a switch responsive to completion of the loading of the chute and with said first switch mutually controlling said actuator.

3. In an automatically operable parts handling and storage apparatus, supporting means having a parts loading station, an empty parts container movable along said supporting means to a first position anterior to said loading station, a parts chute at the loading station having a parts receiving position and movable therefrom to a position to discharge the parts, means operable to move said chute to the discharge position, power means operable to move said container from said first position to the parts loading station, and control means responsive both to the presence of said container in said first position and the loaded condition of said member to control said power means and also the chute moving means.

4. In a parts storage apparatus, means providing a parts loading station and an adjacent ready station for a movable parts receiving fixture, a control actuated by and stopping the fixture at the ready station, means operable to move the fixture from said ready station to said loading station, a parts receiving chute at said loading station tiltable to dump parts into the fixture at the loading station, a power element operable to tilt said chute, means to feed the parts into the chute, a control responsive to the feeding of a predetermined number of the parts into said chute, said first and second controls mutually controlling said moving means to move said fixture to the loading station, and a control actuated by said moving means to control said power element.

5. In a parts storage apparatus, means providing a parts loading station and an adjacent ready station for a movable parts receiving fixture, a control actuated by and stopping the fixture at the ready station, means operable to move the fixture from said ready station to said loading station, a parts receiving chute at said loading station tiltable to dump parts into the fixture at the loading station, a power element operable to tilt said chute, means to feed the parts into the chute, a control responsive to the feeding of a predetermined number of the parts into said chute, said first and second controls mutually controlling said moving means to move said fixture to the loading station, a control actuated by said moving means to control said power element, and a timer energized by said moving means and controlling said power element.

6. In a parts storage apparatus, means providing a parts loading station and an adjacent ready station for a movable parts receiving fixture, a normally open switch mounted on said means between said stations said switch having an operating member in the path of said fixture to close said switch and stop said fixture at the ready station, a second switch mounted on said means and movable from a normally open to a closed position, a reciprocal pusher operable to push the fixture from the ready station to the loading station, means carried by said pusher to actuate said second switch, a power element operable to actuate said pusher, a parts receiving chute at said loading station tiltable from a normal position to dump parts therefrom into a fixture at the loading station, a power element operable to tilt said chute and controlled by said second switch, means to feed parts into the chute, a switch responsive to the feeding of a predetermined number of the parts into the chute, said first and last named switches controlling said first power element to actuate said pusher, and an abutment member carried by said tiltable chute to return said second switch to its normally open position upon return of said chute to normal position.

7. In a parts storage apparatus, means providing a parts loading station and an adjacent ready station for a movable parts receiving fixture, a normally open switch mounted on said means between said stations said switch having an operating member in the path of said fixture to close said switch and stop said fixture at the ready station, a second switch mounted on said means and movable from a normally open to a closed position, a reciprocal pusher operable to push the fixture from the ready station to the loading station, means carried by said pusher to actuate said second switch, a power element operable to actuate said pusher, a parts receiving chute at said loading station tiltable from a normal position to dump parts therefrom into a fixture at the loading station, a power element operable to tilt said chute and controlled by said second switch, means to feed parts into the chute, a switch responsive to the feeding of a predetermined number of the parts into the chute, said first and last named switches controlling said first power element to actuate said pusher, an abutment member carried by said tiltable chute to return said second switch to its normally open position upon return of said chute to normal position, and a timer energized by the closing of said second switch and delaying return of said tiltable chute to normal position.

8. In a parts loading apparatus, means providing a loading station and a ready station adjacent thereto for a movable parts receiving fixture, a normally open switch closable by a fixture moving into the ready station, a normally retracted pusher operable to push the fixture into the loading station, a power element operable to operate said pusher, a chute having a normal parts receiving position and tiltable to discharge the parts into the fixture at the loading station, a second power element having a retractable abutment member normally holding said chute in the normal chute position, a third power element having a retractable abutment member normally spaced from and limiting tilting movement of said chute to a first position, means to feed parts into said chute, a switch responsive to the feeding of a predetermined number of parts into said chute and cooperable with said first switch to activate said first power element to effect the pushing of the fixture into the loading station, a normally open switch closed by said pusher on movement of the fixture to the loading position, said last-named switch controlling said second and third power elements, and a delayed action control operatively connecting said third power element and said last-named switch.

References Cited in the file of this patent

UNITED STATES PATENTS

| | | |
|---|---|---|
| 1,354,250 | Hawthorne | Sept. 28, 1920 |
| 2,067,301 | Miller | Jan. 12, 1937 |
| 2,570,923 | Dodge | Oct. 9, 1951 |
| 2,858,949 | Doepke et al. | Nov. 4, 1958 |
| 2,865,484 | Biddison | Dec. 23, 1958 |
| 2,872,058 | Doepke et al. | Feb. 3, 1959 |